United States Patent
Henerlau et al.

(10) Patent No.: US 9,811,238 B2
(45) Date of Patent: Nov. 7, 2017

(54) METHODS AND SYSTEMS FOR INTERACTING WITH A DIGITAL MARKING SURFACE

(71) Applicant: Sharp Laboratories of America, Inc., Camas, WA (US)

(72) Inventors: Paul R. Henerlau, Portland, OR (US); James E. Owen, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 37 days.

(21) Appl. No.: 14/014,012

(22) Filed: Aug. 29, 2013

(65) Prior Publication Data
US 2015/0067593 A1 Mar. 5, 2015

(51) Int. Cl.
G06F 3/0482 (2013.01)
G06F 3/0488 (2013.01)
G06F 3/0484 (2013.01)

(52) U.S. Cl.
CPC ........ *G06F 3/0482* (2013.01); *G06F 3/04842* (2013.01); *G06F 3/04883* (2013.01)

(58) Field of Classification Search
CPC .................................................. G06F 17/242
See application file for complete search history.

(56) References Cited

U.S. PATENT DOCUMENTS

| | | | |
|---|---|---|---|
| 5,564,112 A | 10/1996 | Hayes et al. | |
| 5,612,719 A * | 3/1997 | Beernink et al. | 345/173 |
| 6,018,346 A | 1/2000 | Moran et al. | |
| 6,525,749 B1 | 2/2003 | Moran et al. | |
| 7,259,752 B1 | 8/2007 | Simmons | |
| 7,305,630 B2 | 12/2007 | Hullender et al. | |
| 7,835,999 B2 | 11/2010 | Block | |
| 8,014,607 B2 | 9/2011 | Saund et al. | |

(Continued)

OTHER PUBLICATIONS

Jakob Nielsen, "Noncommand User Interfaces," Apr. 1, 1993, http://www.nngroup.com/articles/noncommand/.

*Primary Examiner* — Jeffrey A Gaffin
*Assistant Examiner* — Mohamed Abou El Seoud
(74) *Attorney, Agent, or Firm* — Alleman Hall Creasman & Tuttle LLP

(57) ABSTRACT

Aspects of the present invention relate to methods and systems for interacting with a digital marking surface, in particular, to methods and systems for deactivating an ink tool. According to a first aspect of the present invention, a tap gesture, or other gesture, on an ink mark associated with an ink tool may deactivate the ink tool, if the ink tool is active. According to a second aspect of the present invention, a deactivation ink tool may effectuate the deactivation of an active ink tool when a first ink mark associated with the deactivation ink tool is placed on a first ink mark associated with the active ink tool. According to a third aspect of the present invention, a deactivation ink tool may effectuate the deactivation of an active ink tool when an ink mark associated with the deactivation ink tool is placed on a user-input solicitation mechanism associated with the active ink tool. According to a fourth aspect of the present invention, a deactivation ink tool may effectuate the deactivation of an active ink tool when an ink mark associated with the deactivation ink tool is placed on an otherwise unmarked portion of a digital marking surface.

12 Claims, 20 Drawing Sheets

(56) References Cited

U.S. PATENT DOCUMENTS

| | | |
|---|---|---|
| 2003/0095113 A1 | 5/2003 | Ma et al. |
| 2006/0001656 A1 | 1/2006 | LaViola, Jr. et al. |
| 2007/0115264 A1 | 5/2007 | Yu et al. |
| 2008/0082930 A1 | 4/2008 | Omernick et al. |
| 2008/0165141 A1 | 7/2008 | Christie |
| 2009/0193366 A1 | 7/2009 | Davidson |
| 2010/0083191 A1* | 4/2010 | Marshall ............... 715/863 |
| 2010/0123665 A1 | 5/2010 | Birkler |
| 2012/0013539 A1 | 1/2012 | Hogan et al. |
| 2012/0218305 A1* | 8/2012 | Patterson et al. ......... 345/652 |
| 2013/0219340 A1* | 8/2013 | Linge ............ G06F 3/04883 715/834 |
| 2013/0346924 A1* | 12/2013 | Morrill et al. ............ 715/863 |
| 2014/0298223 A1* | 10/2014 | Duong et al. ............ 715/765 |

* cited by examiner

METHODS AND SYSTEMS FOR INTERACTING WITH A DIGITAL MARKING SURFACE

FIELD OF THE INVENTION

Aspects of the present invention relate generally to methods and systems for interacting with a digital marking surface and, more particularly, to methods and systems for managing an ink tool.

BACKGROUND

A digital-marking-surface apparatus may comprise a digital marking surface on which a user may draw a digital ink mark and on which other digital content may be displayed. Digital ink marks may be placed on the digital marking surface, by a user, using a pen device, a stylus, a finger or another marking device or object. Additionally, other digital content, for example, an image, video content playing in a video window, a computer application running in an application window, content associated with a remote desktop, web content, multimedia content and other digital content, may be displayed on the digital marking surface.

Methods and systems for enhancing user interaction with a digital marking surface without disruption of instruction, thought conveyance and/or thought capture may be desirable.

SUMMARY

Some embodiments of the present invention comprise methods and systems for interacting with a digital marking surface, in particular, methods and systems for deactivating an ink tool.

According to a first aspect of the present invention, a tap gesture, or other gesture, on an ink unit associated with an ink tool may deactivate the ink tool, if the ink tool is active.

According to a second aspect of the present invention, a deactivation ink tool may effectuate the deactivation of an active ink tool when a first ink unit associated with the deactivation ink tool is placed on a second ink unit associated with the active ink tool.

According to a third aspect of the present invention, a deactivation ink tool may effectuate the deactivation of an active ink tool when an ink unit associated with the deactivation ink tool is placed on a user-input solicitation mechanism associated with the active ink tool.

According to a fourth aspect of the present invention, a deactivation ink tool may effectuate the deactivation of an active ink tool when an ink unit associated with the deactivation ink tool is placed on an otherwise unmarked portion of a digital marking surface.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

DETAILED DESCRIPTION OF EXEMPLARY EMBODIMENTS

Figure 1:
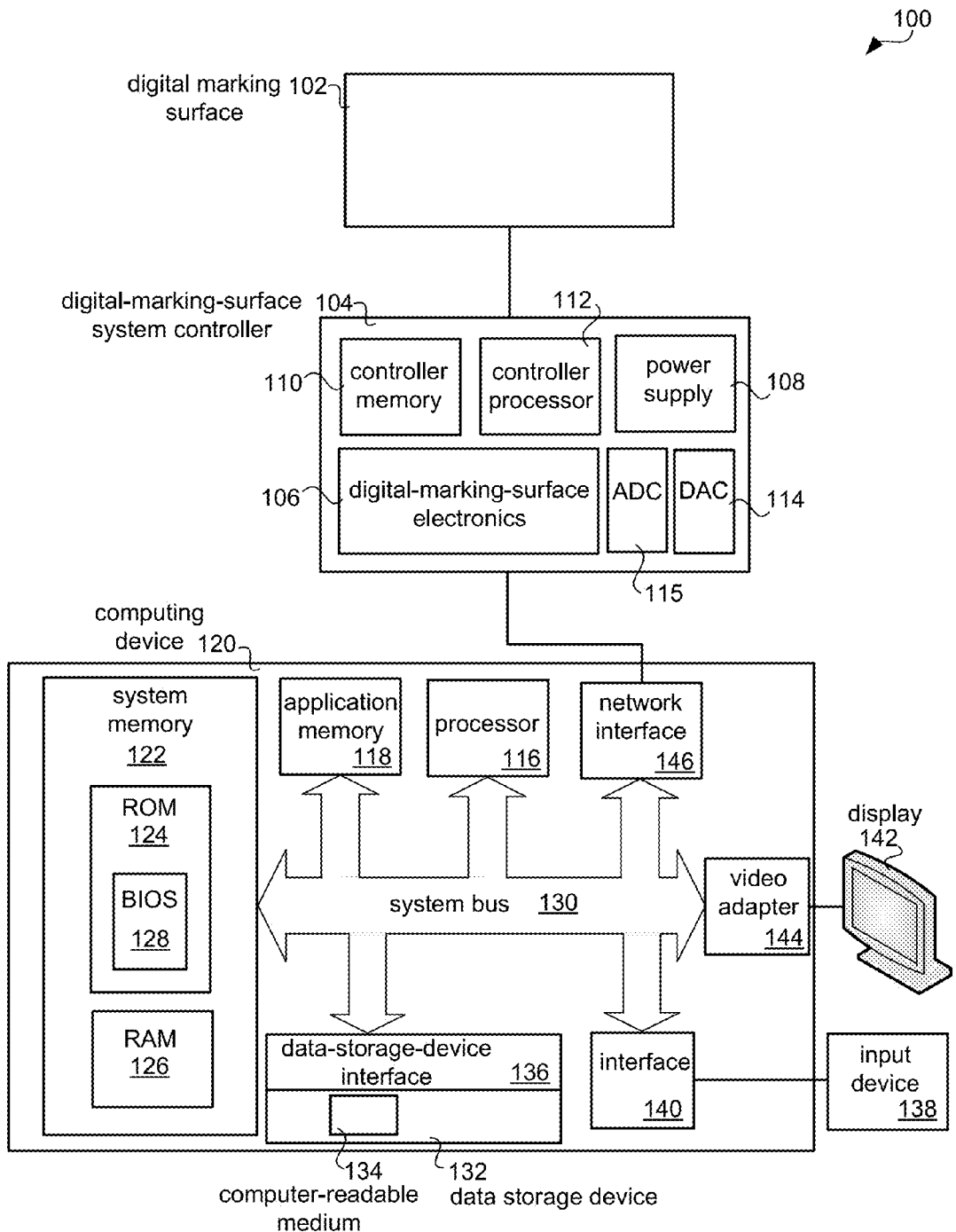
FIG. 1 is a picture illustrating exemplary embodiments of the present invention comprising a digital-marking-surface system.

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods, systems and apparatus of the present invention is not intended to limit the scope of the invention, but it is merely representative of the presently preferred embodiments of the invention.

Elements of embodiments of the present invention may be embodied in hardware, firmware and/or a non-transitory computer program product comprising a computer-readable storage medium having instructions stored thereon/in which may be used to program a computing system. While exemplary embodiments revealed herein may only describe one of these forms, it is to be understood that one skilled in the art would be able to effectuate these elements in any of these forms while resting within the scope of the present invention.

Although the charts and diagrams in the figures may show a specific order of execution, it is understood that the order of execution may differ from that which is depicted. For example, the order of execution of the blocks may be changed relative to the shown order. Also, as a further example, two or more blocks shown in succession in a figure may be executed concurrently, or with partial concurrence. It is understood by those with ordinary skill in the art that a non-transitory computer program product comprising a computer-readable storage medium having instructions stored thereon/in which may be used to program a computing system, hardware and/or firmware may be created by one of ordinary skill in the art to carry out the various logical functions described herein.

A digital-marking-surface apparatus may comprise a digital marking surface on which a user may draw a digital ink mark and on which other digital content may be displayed. Digital ink marks may be placed on the digital marking surface, by a user, using a pen device, a stylus, a finger or another marking device or object. Additionally, other digital content, for example, an image, video content playing in a video window, a computer application running in an application window, content associated with a remote desktop, web content, multimedia content and other digital content, may be displayed on the digital marking surface.

Methods and systems for enhancing user interaction with a digital marking surface without disruption of instruction, thought conveyance and/or thought capture may be desirable.

Exemplary devices comprising a digital marking surface may include an electronic interactive whiteboard (IWB) device, a tablet computing device, a cellular telephone, an entertainment device, a combined input/display device comprising a touch panel and other devices that support touch-based, stylus-based and/or digital-pen-based user placement of digital ink marks on the digital marking surface and may comprise a controller and a processor for processing the digital ink marks and controlling the display of content, on the digital marking surface, based on the processing results.

FIG. 1 illustrates an exemplary digital-marking-surface system 100 according to some embodiments of the present invention. The digital-marking-surface system 100 may comprise a digital marking surface 102, for example, an interactive whiteboard, a touch-screen display and other digital marking surfaces. Some embodiments of the present invention may comprise an electronic interactive whiteboard comprising a sensing technology for tracking an interaction on the digital marking surface 102. Exemplary sensing technologies include resistive sensing technologies, capacitive sensing technologies, active electromagnetic sensing technologies, passive electromagnetic sensing technologies, optical sensing technologies, for example, infrared based, laser based, camera based and other optical-based sensing technologies, ultrasonic sensing technologies, dispersive signal technologies and other sensing technologies.

A user may place a digital ink mark, also considered an ink mark, a digital mark and a digital-ink-mark, on the digital marking surface 102 using a marking device, for example, a mouse, a keyboard, a stylus, a specialized marking-device pen, a finger and other marking devices capable of inputting a digital ink mark on the digital marking surface 102. The digital marking surface 102 may also display digital images and other digital content, for example, a digital video playing in a video window, a computer application running in an application window, content associated with a remote desktop, web content, multimedia content and other digital content. Ink marks and other digital content displayed on the digital marking surface 102 may collectively be referred to as content.

The digital-marking-surface system 100 may comprise a digital-marking-surface system controller 104 for controlling the digital-marking-surface system 100. The digital-marking-surface system controller 104 may comprise digital-marking-surface electronics 106 for controlling the digital marking surface 102, for making measurements from the digital marking surface 102 and for other control functions associated with the digital-marking-surface system 100. The digital-marking-surface system controller 104 may comprise a power supply 108, a controller memory 110, a controller processor 112, a digital-to-analog converter (DAC) 114 and an analog-to-digital converter (ADC) 115. In some embodiments of the present invention (not shown), the digital-marking-surface system controller 104 may be physically integrated into a single apparatus with the digital marking surface 102. In alternative embodiments, the digital-marking-surface system controller 104 may be physically separate from, but electronically and communicatively connected to, the digital marking surface 102.

The digital-marking-surface system 100 may comprise a processor 116 and an application memory 118. In some embodiments of the present invention (not shown), the processor 116 and the application memory 118 may be physically integrated into a single apparatus with the digital marking surface 102. In alternative embodiments of the present invention (not shown), the processor 116 and the application memory 118 may be physically integrated into a single apparatus with the digital-marking-surface system controller 104. In yet alternative embodiments of the present invention, the processor 116 and the application memory 118 may be separate from, but electronically and communicatively connected to, one, or both, of the digital marking surface 102 and the digital-marking-surface system controller 104. In some embodiments of the present invention, the processor 116 and application memory 118 may reside in a computing device 120.

An exemplary computing device 120 may comprise system memory 122, which may comprise read-only memory (ROM) 124 and random-access memory (RAM) 126. The exemplary computing device 120 may comprise a basic input/output system (BIOS) 128, which may reside in ROM 124, for controlling the transfer of information between the components of the computing device 120 via a system bus 130. The exemplary computing device 120 may comprise one, or more, data storage devices (one shown) 132, for example, a hard disk drive, a magnetic disk drive, an optical disk drive or other data storage device, for reading from and writing to a computer-readable medium (one shown) 134, for example, a hard disk, an optical disk, a magnetic disk or other computer-readable medium. The exemplary computing device 120 may also comprise an associated data-storage-device interface 136 for connecting the data storage device 132 to the system bus 130.

A digital-marking-surface application program may be stored on the read-only memory 124, on the random-access memory 126 or on the one, or more, data storage devices 132. The digital-marking-surface application program may comprise instructions that, when executed, may control the digital-marking-surface system 100, may process input from the digital marking surface 102, may effectuate changes in the content displayed on the digital marking surface 102 and may otherwise implement a digital-marking-surface application program.

The exemplary computing device 120 may comprise an input device 138, for example, a mouse, a keyboard, a joystick or other input device, which may be connected, to the system bus 130, via an interface 140, for example, a parallel port, game port, universal serial bus or other interface.

The exemplary computing device 120 may comprise a display 142, which may be connected, via a video adapter 144, to the system bus 130.

The exemplary computing device 120 may be communicatively coupled with the digital-marking-surface system controller 104 via a network interface 146 or other communication connection.

Figure 2:
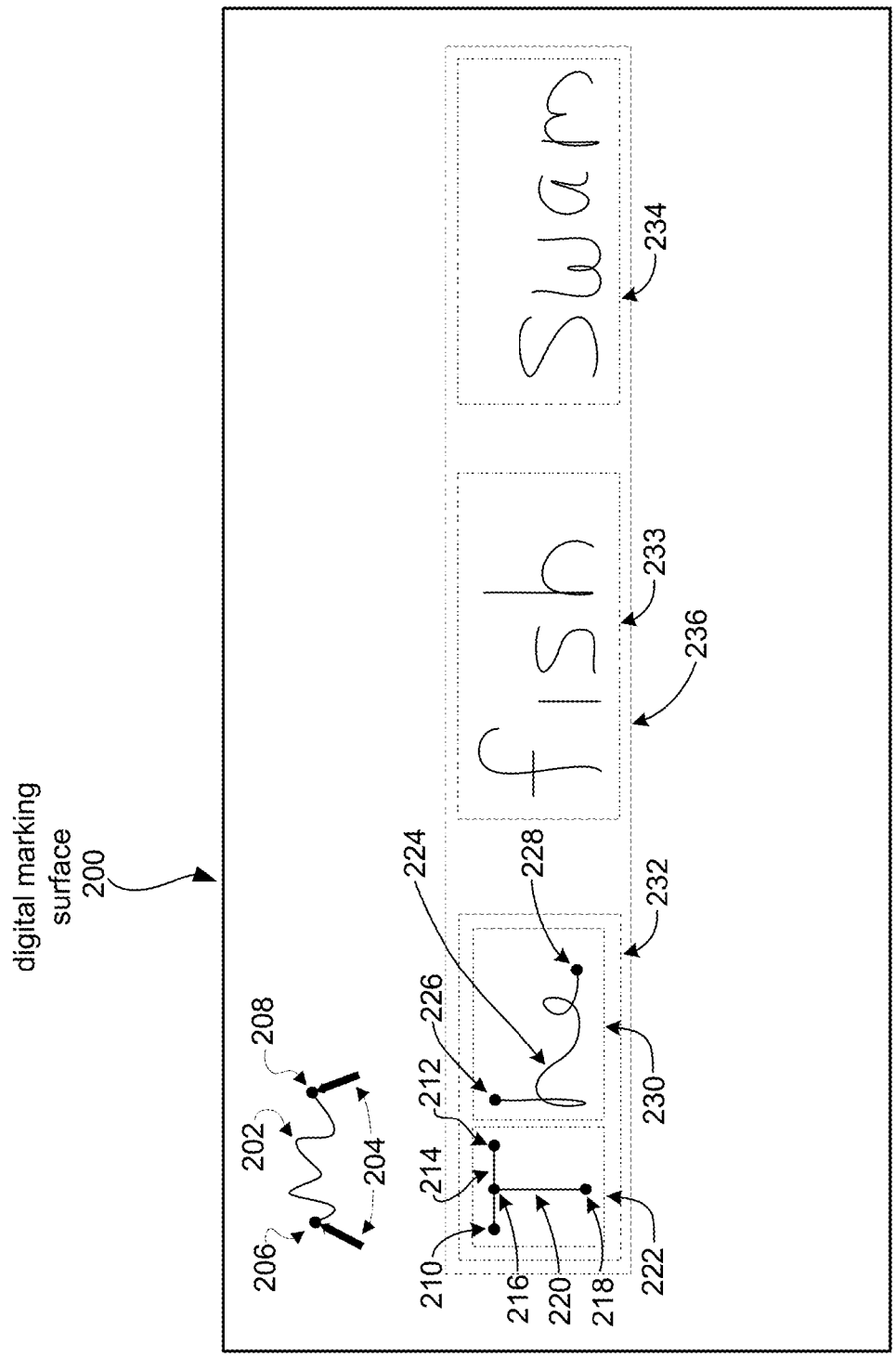
FIG. 2 is a picture illustrating the relationship between digital ink marks and ink units according to some embodiments of the present invention.

Some embodiments of the present invention may be understood in relation to FIG. 2. FIG. 2 depicts a digital marking surface 200. During use, a user may create a digital ink mark, or digital ink stroke, 202 with "digital ink" on the digital marking surface 200. Typically, a user will use a pen, stylus, finger or other digital marking device 204 to activate sensors that locate the digital marking device 204 relative to the digital marking surface 200 and place a digital ink mark 202 on the digital marking surface 200 at the location of the digital marking device 204. A digital marking device 204 may comprise electronics or other components to enhance or enable detection, however, in some embodiments, a digital marking device 204 may simply be a user's finger or a dumb stylus. A digital marking device 204 may be anything used to make a digital ink mark on the digital marking surface 200.

Sensors of the digital-marking-surface system 100 may detect the digital marking device 204 when the digital marking device 204 makes contact, for example, at location 206, with the digital marking surface 200. This may be referred to as a "pen-down" action. Sensors of the digital-marking-surface system 100 may also detect a location 208 at which the digital marking device 204 leaves contact with the digital marking surface 200. This may be referred to as a "pen-up" action. The motion of the digital marking device 204 along the digital marking surface 200 between a pen-down-action location 206 and a pen-up-action location 208 may be used to define a digital ink mark 202. A digital ink mark 202 may take any shape and may relate to handwriting symbols, graphics or other marks. In typical use, digital ink marks will define alphanumeric characters and diagrammatical elements.

A digital-marking-surface system controller and/or a connected computing device may be used to identify digital ink marks through system sensors as the digital ink marks are input and to convert sensor input into an image of the digital mark displayed on the digital marking surface 200. Accordingly, as a user writes with a digital marking device 204 on the digital marking surface 200, a digital ink mark 202 appears on the digital marking surface 200 at the location of the digital marking device 204. When a digital ink mark is converted to an image displayed on the digital marking surface 200, that image of the mark may be referred to as a basic ink unit.

The digital-marking-surface system controller and/or a connected computing device may also function to aggregate basic ink units into compound ink units. A plurality of basic ink units may be aggregated into a single compound ink unit. For example, a series of handwritten characters may be aggregated into a word represented by a compound ink unit. As another example, a series of words represented by basic or compound ink units may be aggregated into another compound ink unit corresponding to a sentence or paragraph. Aggregation of ink units may be based on geometric relationships, semantic relationships and other relationships.

With further reference to FIG. 2, a user may place a digital ink mark by a pen-down action at a first location 210 followed by a horizontal stroke and pen-up action at a second location 212. In response, a digital-marking-surface system controller or a connected computing device draws a first basic ink unit 214 between the first location 210 and the second location 212. The system may then analyze first basic ink unit 214 to determine whether it conforms to any known character, symbol or predefined diagrammatic gesture description, also considered an ink gesture. If first basic ink unit 214 does not conform to any predefined diagrammatic gesture description, it may persist as a basic ink unit. The user may then place another digital ink mark on digital marking surface 200 with a pen-down action at a third location 216 followed by a stroke and a pen-up action at a fourth location 218. The system converts this digital ink mark into a second basic ink unit 220 displayed on the digital marking surface 200. The system then analyzes second basic ink unit and any other basic ink units proximate to second basic ink unit. In this example, first basic ink unit is proximate to second basic ink unit so first and second basic ink units are analyzed together to determine whether, together, they conform to a known description. In this case, the basic ink units are recognized as the letter "T" and are combined as a compound ink unit 222 comprising the alphanumeric character "T". The user may then make another digital ink mark 224 with a pen-down action at a fifth location 226, a cursive stroke and a pen-up action at a sixth location 228. The digital-marking-surface system controller and/or a connected computing device may convert this action into a basic ink unit 230. This third basic ink unit may be analyzed and converted to a compound ink unit with the characters "h" and "e". Because of the proximity and orientation of third basic ink unit 230 and compound ink unit 222, this combination of ink units may be analyzed and another compound ink unit 232 may be created to represent the word "The". Similar processes may be used to create compound ink units 233, 234. Compound ink units may be further analyzed to determine further relationships. In this example, compound ink units 232-234 may be analyzed and found to constitute a sentence based on character recognition, grammatical rules and other relationships. Another compound ink unit 236 may be created to represent this sentence. Basic and compound ink units may be generated for strokes, characters, shapes, images and other diagrammatical objects and marks.

In some embodiments of the present invention, basic and compound ink units may be generated for strokes, characters, shapes, images and other diagrammatical objects and marks drawn within temporal and/or spatial limits. In alternative embodiments of the present invention, basic and compound ink units may be generated for strokes, characters, shapes, images and other diagrammatical objects and marks drawn in accordance with a predefined dictionary. For example, a plurality of ink marks matching a predefined template or dictionary entry may be grouped into a compound ink unit irrespective of temporal or z-order placement on the digital marking surface.

An ink unit along with a dynamic characteristic of the placement of the ink unit may be considered an ink gesture.

In some embodiments of the present invention, a predefined ink unit may be associated with a software entity, or other control entity, that may effectuate content manipulation or other control actions. In some embodiments of the present invention, the predefined ink unit may comprise a compound ink unit. In some embodiments, the compound ink unit may comprise a plurality of spatially proximate basic ink units. In alternative embodiments, the compound ink unit may comprise a plurality of spatially separated ink units. In some embodiments of the present invention, a predefined ink gesture may be associated with a software entity, or other control entity, that may effectuate content manipulation or other control actions.

Such a predefined ink unit or ink gesture associated with a software entity, or other control entity, that may effectuate content manipulation or other control actions may be referred to as an ink-tool mark, an ink-tool ink mark, an ink-tool unit, an ink-tool ink unit, an ink-tool gesture and/or an ink-tool ink gesture, wherein "ink tool" may refer to the software entity, or other control entity, that may effectuate content manipulation or other control actions.

To cause an ink tool to execute may be referred to as activating the ink tool. Activation of an ink tool may initiate a query for user input. For some ink tools, user input may be required to disambiguate the user-intended action. In some embodiments of the present invention, a pop-up menu, also referred to as a floatie, may be used to query for user input. In alternative embodiments, other mechanisms, for example, a radio button, a slider bar, a text-input window and other graphical-user-interface mechanisms, for solicitation of user input may be used.

In some embodiments of the present invention, recognition of an ink-tool mark may automatically effectuate activation of the ink tool. In alternative embodiments of the present invention, an ink tool may require an activation gesture before the ink tool operates. An ink tool in a state wherein an activation gesture is required for operation may be referred to as a "dormant" ink tool, and the state of a "dormant" ink tool may be referred to as the dormant state. An ink tool that operates without further action may be referred to as an "active" ink tool, and the state of an "active" ink tool may be referred to as the active state. An ink tool in a wait-state waiting for user input may be referred to as a "pending" ink tool, and the state of a "pending" ink tool may be referred to as the pending state. In some embodiments of the present invention, deactivation of an ink tool may place an ink tool in a dormant state. In some embodiments of the present invention, a data structure identifying all detected ink tools and their respective states may be maintained. In alternative embodiments of the present invention, deactivation of an ink tool may remove any ink tool association with the ink unit associated with the ink tool.

Some embodiments of the present invention may use Microsoft's Windows Presentation Foundation (WPF). WPF comprises a resolution-independent, vector-based rendering engine that works in conjunction with digital-marking-surface system controller and/or a connected computing device. Some embodiments may use Extensible Application Markup Language (XAML) markup along with managed programming language code stored on and implemented by digital-marking-surface system controller and/or a connected computing device. Some embodiments of the present invention may use Microsoft gesture recognition tools.

In some embodiments of the present invention, an ink unit or ink gesture may be associated with an ink tool which may effectuate the manipulation of content displayed on the digital marking surface.

Figure 3:
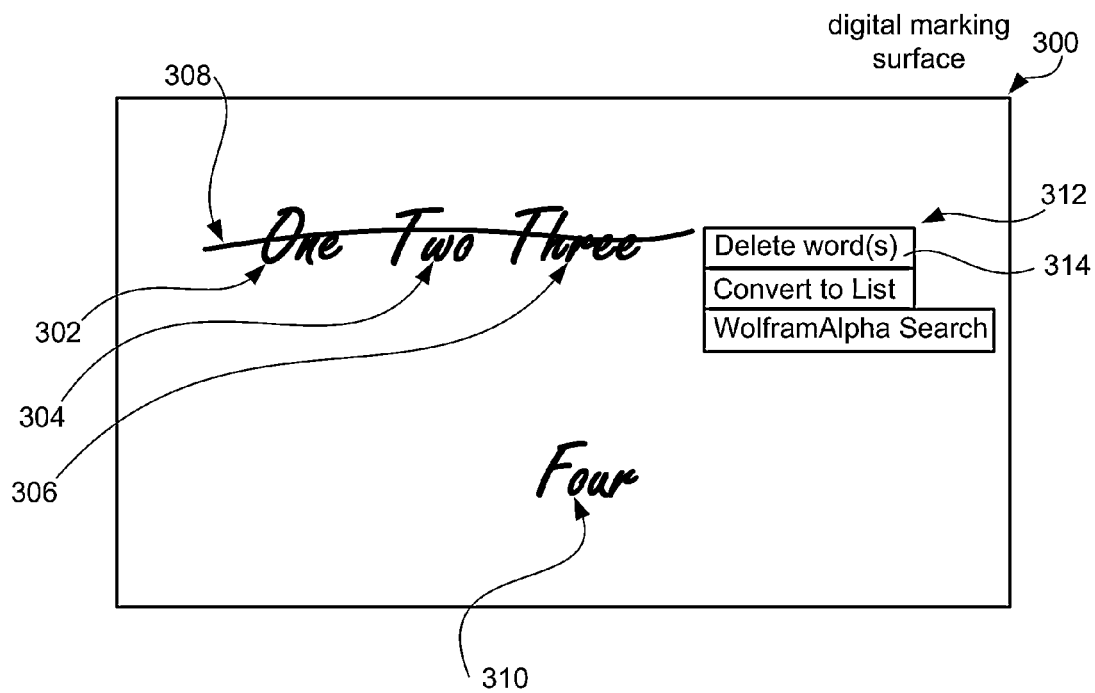
FIG. 3 is a picture illustrating the functionality of an exemplary ink tool according to some embodiments of the present invention.

FIG. 3 illustrates the behavior of an exemplary ink tool in accordance with some embodiments of the present invention. FIG. 3 depicts a digital marking surface 300 on which four compound ink units have been placed: a first compound ink unit 302 corresponding to the word "One"; a second compound ink unit 304 corresponding to the word "Two"; a third compound ink unit 306 corresponding to the word "Three"; and a fourth compound ink unit 310 corresponding to the word "Four". An ink unit 308 in the form of a line drawn across the three words "One", "Two" and "Three" has been placed on the digital marking surface 300. In this example, the ink unit 308 corresponds to a first ink tool which may effectuate one of three actions on the intersected content: a first action deleting the intersected content; a second action converting the intersected content to a list; and a third action performing a Wolfram Alpha search on the intersected content. Thus, the ink unit 308 may be referred to as the ink-tool ink mark associated with the first ink tool. In order to disambiguate the user-intended action, a pop-up menu 312, also referred to as a floatie, presenting the multiple options may be displayed on the digital marking surface 300. In alternative embodiments, not shown, an alternative user-input solicitation mechanism (UISM) may be used. Thus, the first ink tool is "pending" as it requires user-input event before it may operate. In this example, upon recognition of the ink-tool ink mark associated with the first ink tool, the first ink tool may be automatically activated without a further activation event.

Figure 4:
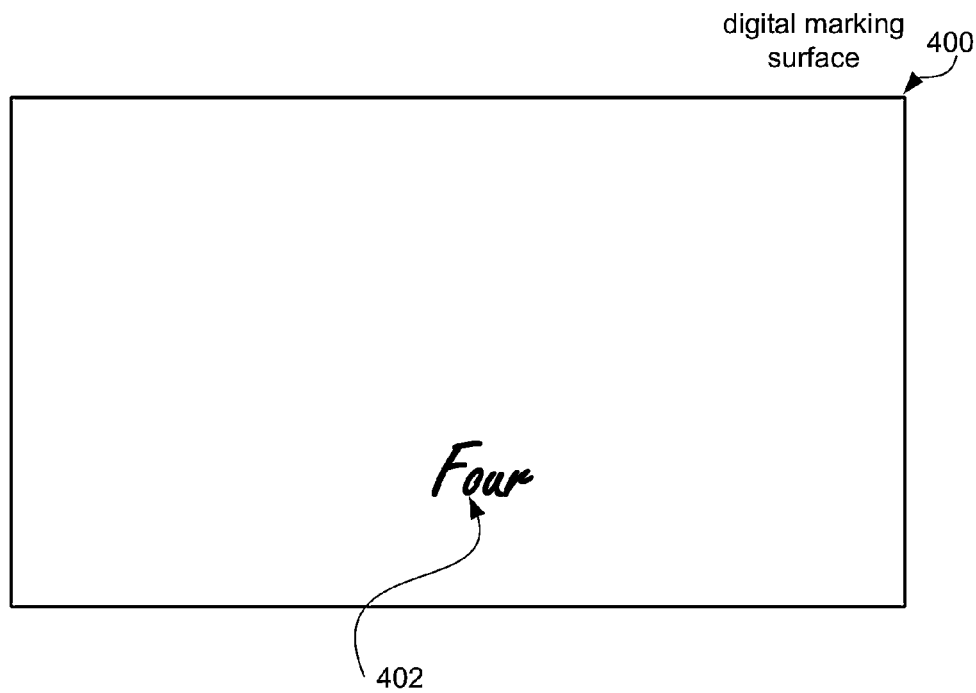
FIG. 4 is a picture illustrating the behavior of an exemplary ink tool according to some embodiments of the present invention.

When a user selects one of the menu items from the floatie 312, the ink unit 308 corresponding to the first ink tool, in addition to the floatie 312, may be removed from the digital marking surface 300, and an action associated with the floatie 312 command may be executed. In the example shown in FIG. 3, if the menu item 314 "Delete word(s)" is selected, the ink units 302, 304, 306 intersecting the ink unit 308 corresponding to the ink tool may be removed from the digital marking surface 300 when the selected menu-item 314 command from the floatie 312 is executed. The floatie 312 and the ink-tool ink mark 308 associated with the first ink tool may be removed from the digital marking surface 300 also, effectively deleting the first ink tool. FIG. 4 illustrates the digital marking surface 400 after the selected menu-item 314 command from the floatie 312 is executed. As illustrated, only the compound ink unit 402 "Four" remains.

According to some embodiments of the present invention, if no menu item from a floatie 312 is selected within a timeout period, the floatie 312 may be removed from the digital marking surface 300. In some embodiments of the present invention, the first ink tool may be deactivated and the ink-tool ink mark (ink unit 308) associated with the first ink tool may persist without the ink tool association. In alternative embodiments of the present invention, the first ink tool may be deactivated and the ink-tool ink mark (ink unit 308) associated with the first ink tool may persist in association with the first ink tool in a "dormant" state.

Figure 5:
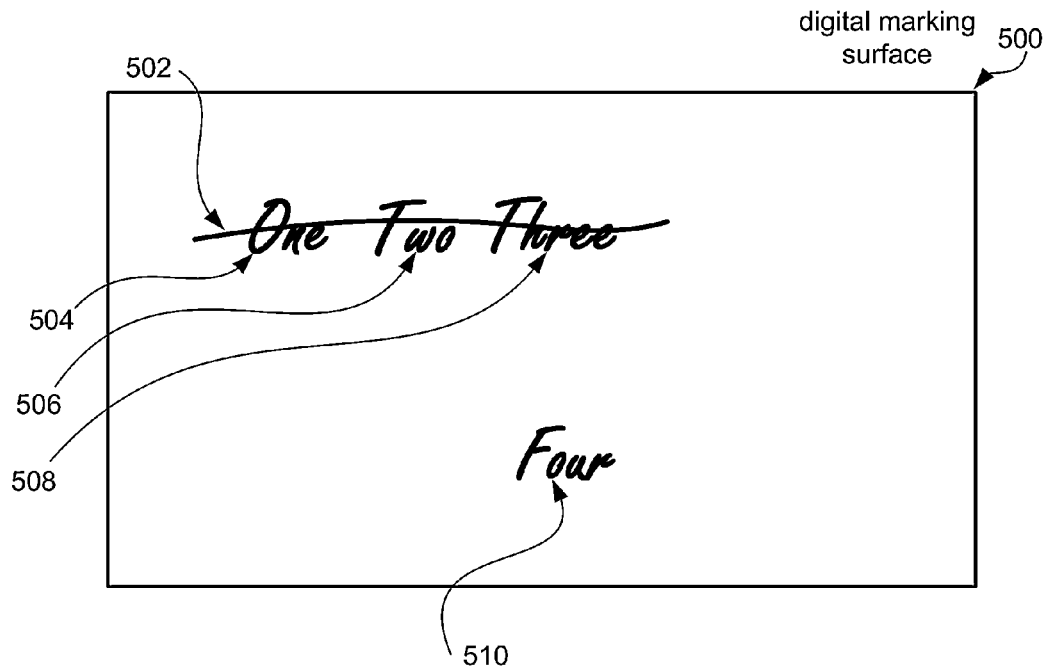
FIG. 5 is a picture illustrating the behavior of a time-out ink-tool deactivation according to some embodiments of the present invention.

FIG. 5 illustrates the digital marking surface 500 after a timeout period during which no menu item was selected from the floatie 312. The ink unit 502 persists without an associated displayed floatie. The compound ink units "One" 504, "Two" 506, "Three" 508 and "Four" 510 remain.

According to some embodiments of the present invention, a first ink tool may be deactivated by a second ink tool associated with deactivation. Some of these embodiments may be understood in relation to FIGS. 6-8.

Figure 6:
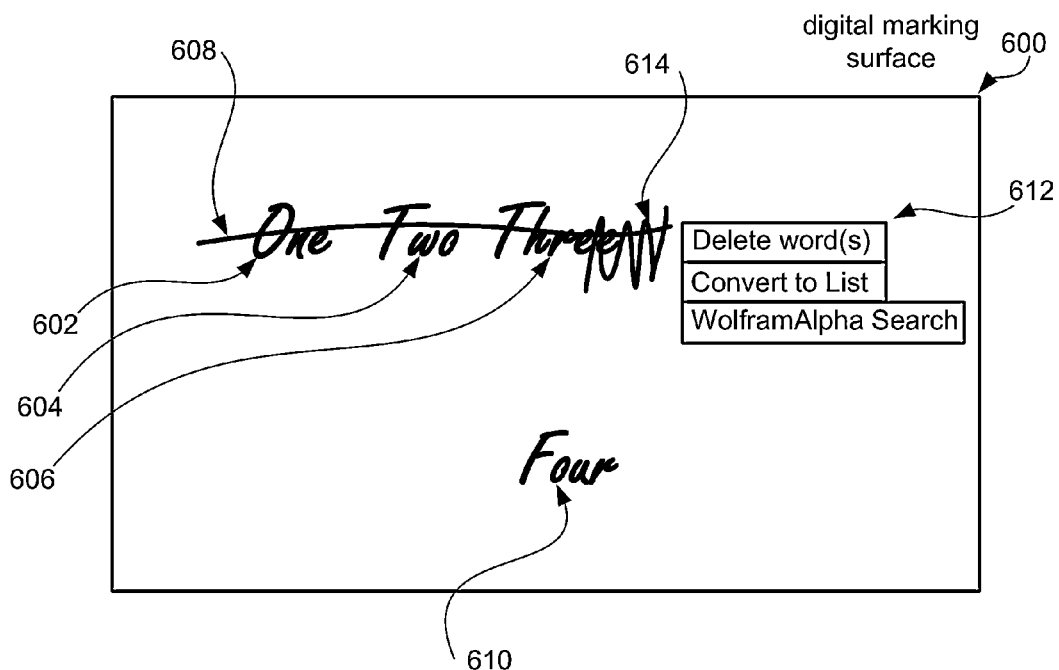
FIG. 6 is a picture illustrating the functionality of an exemplary deactivation ink tool, according to some embodiments of the present invention, comprising placement of a first ink unit associated with the deactivation ink tool on a second ink unit associated with the ink tool for which deactivation is desired.

FIG. 6 depicts a digital marking surface 600 on which four compound ink units have been placed: a first compound ink unit 602 corresponding to the word "One"; a second compound ink unit 604 corresponding to the word "Two"; a third compound ink unit 606 corresponding to the word "Three"; and a fourth compound ink unit 610 corresponding to the word "Four". An ink unit 608 in the form of a line drawn across the three words "One", "Two" and "Three" has been placed on the digital marking surface 600. In this example, the ink unit 608 corresponds to a first ink tool which may effectuate one of three actions on the intersected content: a first action deleting the intersected content; a second action converting the intersected content to a list; and a third action performing a Wolfram Alpha search on the intersected content. In order to disambiguate the user-intended action, a pop-up menu 612, also referred to as a floatie, presenting the multiple options may be displayed on the digital marking surface 600. In alternative embodiments, not shown, an alternative UISM may be used.

In some embodiments of the present invention, a deactivation-ink-tool ink mark, for example, a "scribble" ink unit 614 placed on the digital marking surface 600 such that the "scribble" ink unit 614 intersects the ink-tool mark 608 associated with the first ink tool, may effectuate deactivation of the first ink tool. The deactivation-ink-tool ink mark 614 may be recognized and a deactivation ink tool may be instantiated which may deactivate the first ink tool. Thus, as when the first ink tool was deactivated due to a timeout, FIG. 5 illustrates the digital marking surface 500 after deactivation of the first ink tool associated with the ink-tool mark 608. The ink unit 502 persists without an associated displayed floatie. The compound ink units "One" 504, "Two" 506, "Three" 508 and "Four" 510 remain, while the "scribble" ink unit 614 is removed as the deactivation ink tool effectuates the deactivation of the first ink tool.

Figure 7:
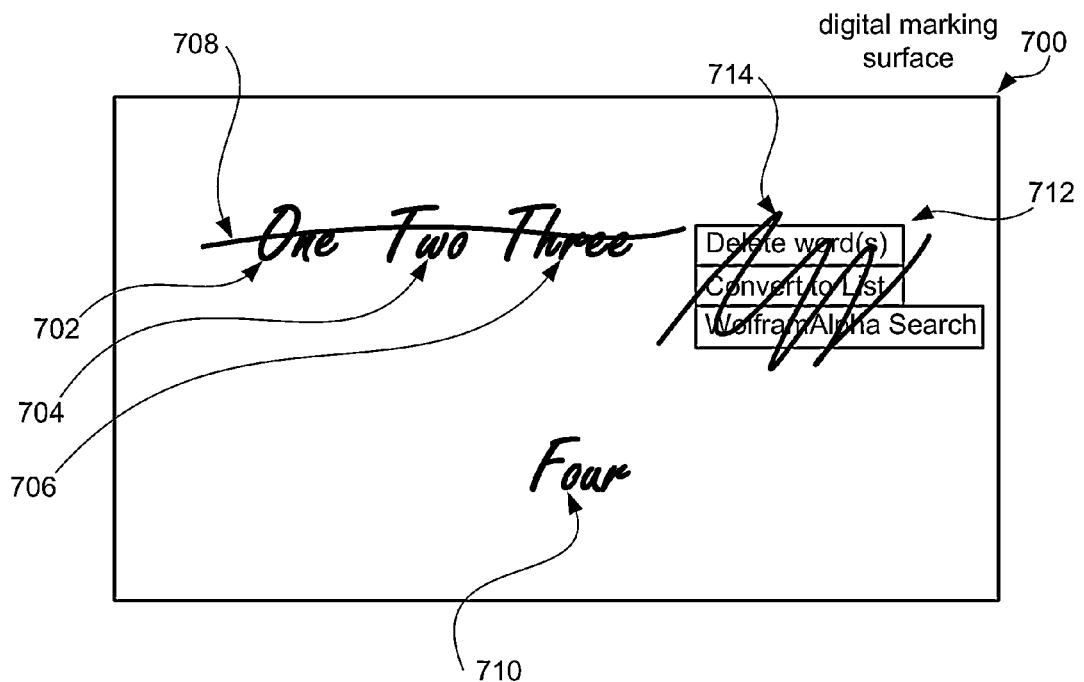
FIG. 7 is a picture illustrating the functionality of an exemplary deactivation ink tool, according to some embodiments of the present invention, comprising placement of an ink unit associated with the deactivation ink tool on a floatie associated with the ink tool for which deactivation is desired.

FIG. 7 depicts a digital marking surface 700 on which four compound ink units have been placed: a first compound ink unit 702 corresponding to the word "One"; a second compound ink unit 704 corresponding to the word "Two"; a third compound ink unit 706 corresponding to the word "Three"; and a fourth compound ink unit 710 corresponding to the word "Four". An ink unit 708 in the form of a line drawn across the three words "One", "Two" and "Three" has been placed on the digital marking surface 700. In this example, the ink unit 708 corresponds to a first ink tool which may effectuate one of three actions on the intersected content: a first action deleting the intersected content; a second action converting the intersected content to a list; and a third action performing a Wolfram Alpha search on the intersected content. In order to disambiguate the user-intended action, a pop-up menu 712, also referred to as a floatie, presenting the multiple options may be displayed on the digital marking surface 700. In alternative embodiments, not shown, an alternative UISM may be used.

In some embodiments of the present invention, a deactivation-ink-tool ink mark, for example, a "scribble" ink unit 714 placed on the digital marking surface 700 such that the "scribble" ink unit 714 intersects the floatie 712 associated with the first ink tool may effectuate deactivation of the first ink tool. In some embodiments of the present invention, a further condition that the "scribble" ink unit does not originate on the floatie may be required. As when the first ink tool was deactivated due to a timeout, FIG. 5 illustrates the digital marking surface 500 after deactivation of the first ink tool associated with the ink-tool mark 708. The ink unit 502 persists without an associated displayed floatie. The compound ink units "One" 504, "Two" 506, "Three" 508 and "Four" 510 remain, while the "scribble" ink mark 714 and the floatie 712 are removed as the deactivation ink tool effectuates the deactivation of the first ink tool.

Figure 8:
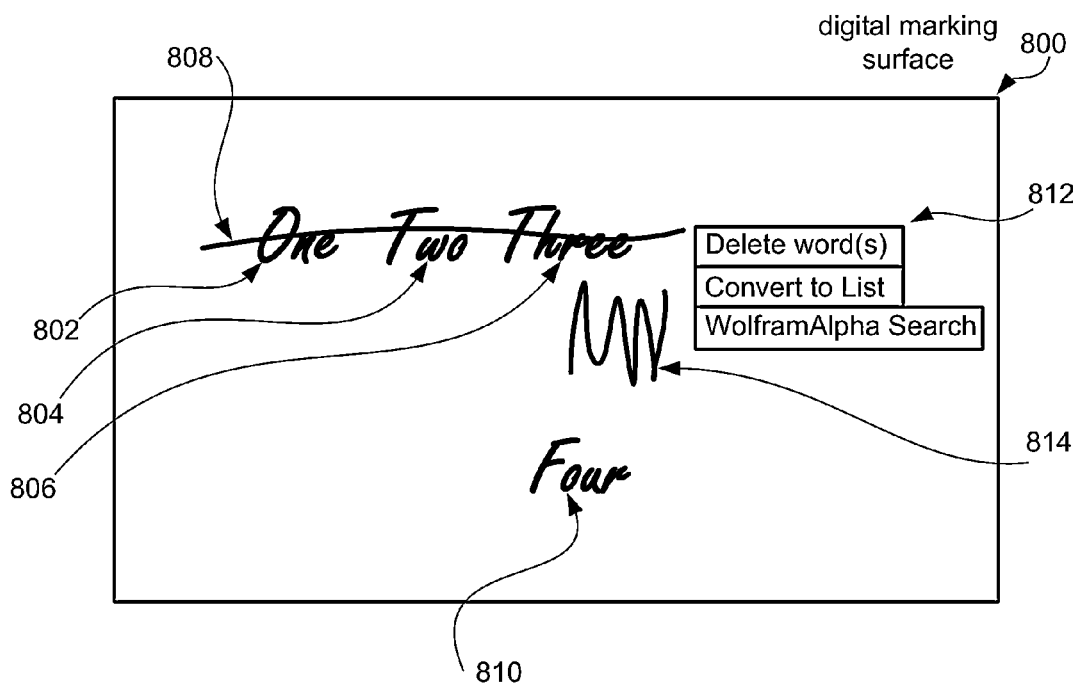
FIG. 8 is a picture illustrating the functionality of an exemplary deactivation ink tool, according to some embodiments of the present invention, comprising placement of an ink unit associated with the deactivation ink tool on any otherwise unoccupied portion of a digital marking surface.

FIG. 8 depicts a digital marking surface 800 on which four compound ink units have been placed: a first compound ink unit 802 corresponding to the word "One"; a second compound ink unit 804 corresponding to the word "Two"; a third compound ink unit 806 corresponding to the word "Three"; and a fourth compound ink unit 810 corresponding to the word "Four". An ink unit 808 in the form of a line drawn across the three words "One", "Two" and "Three" has been placed on the digital marking surface 800. In this example, the ink unit 808 corresponds to a first ink tool which may effectuate one of three actions on the intersected content: a first action deleting the intersected content; a second action converting the intersected content to a list; and a third action performing a Wolfram Alpha search on the intersected content. In order to disambiguate the user-intended action, a pop-up menu 812, also referred to as a floatie, presenting the multiple options may be displayed on the digital marking surface 800. In alternative embodiments, not shown, an alternative UISM may be used.

In some embodiments of the present invention, a deactivation-ink-tool ink mark, for example, a "scribble" ink unit 814 placed on an otherwise blank region of the digital marking surface 800 may effectuate deactivation of the first ink tool. Thus as when the first ink tool was deactivated due to a timeout, FIG. 5 illustrates the digital marking surface 500 after deactivation of the first ink tool associated with the ink mark 808. The ink unit 502 persists without any ink tool association. The compound ink units "One" 504, "Two" 506, "Three" 508 and "Four" 510 remain. In some embodiments of the present invention, a deactivation-ink-tool ink mark placed on an otherwise blank region of a digital marking surface may effectuate deactivation of all active ink tools. In alternative embodiments of the present invention, a deactivation-ink-tool ink mark placed on an otherwise blank region of a digital marking surface may effectuate deactivation of all active ink tools of a particular type. In yet alternative embodiments of the present invention, a deactivation-ink-tool ink mark placed on an otherwise blank region of a digital marking surface may effectuate deactivation of all active ink tools activated within a time interval relative to the placement of the deactivation-ink-tool ink mark.

Figure 9:
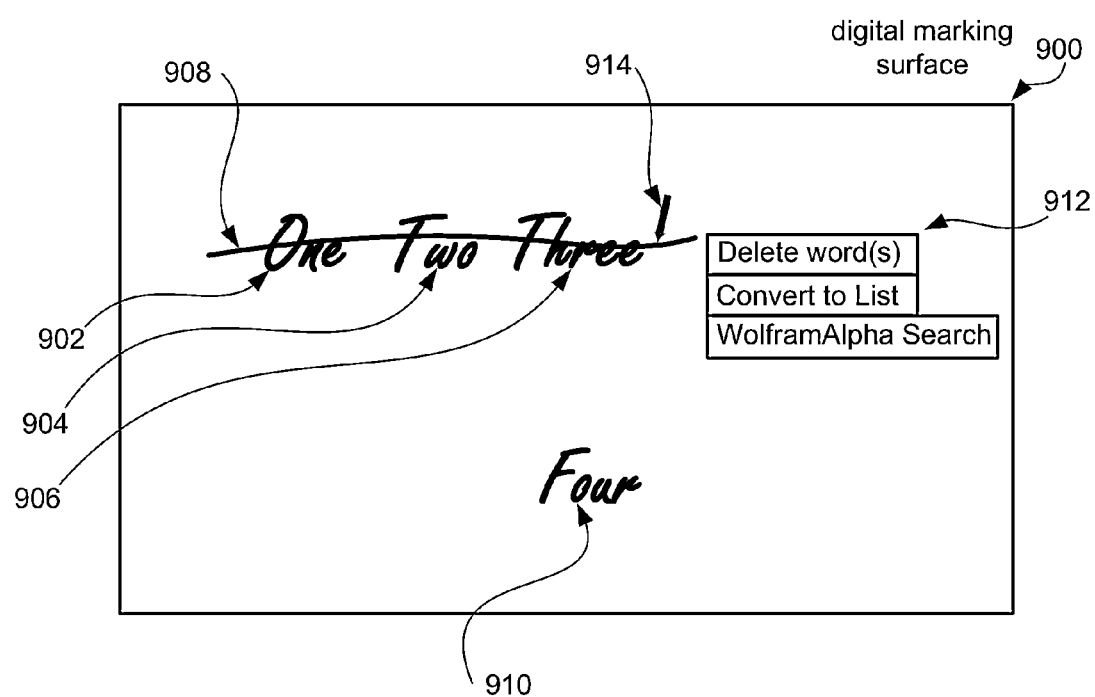
FIG. 9 is a picture illustrating ink-tool deactivation, according to some embodiments of the present invention, comprising a tap gesture on an ink unit associated with the ink tool for which deactivation is desired.

FIG. 9 depicts a digital marking surface 900 on which four compound ink units have been placed: a first compound ink unit 902 corresponding to the word "One"; a second compound ink unit 904 corresponding to the word "Two"; a third compound ink unit 906 corresponding to the word "Three"; and a fourth compound ink unit 910 corresponding to the word "Four". An ink unit 908 in the form of a line drawn across the three words "One", "Two" and "Three" has been placed on the digital marking surface 900. In this example, the ink unit 908 corresponds to a first ink tool which may effectuate one of three actions on the intersected content: a first action deleting the intersected content; a second action converting the intersected content to a list; and a third action performing a Wolfram Alpha search on the intersected content. In order to disambiguate the user-intended action, a pop-up menu 912, also referred to as a floatie, presenting the multiple options may be displayed on the digital marking surface 900. In alternative embodiments, not shown, an alternative UISM may be used.

In some embodiments of the present invention, an ink tool, for example, the first ink tool associated with the ink unit 908, may be deactivated by a tap gesture, with a marking device 914, on the ink unit associated with the first ink tool. Thus as when the first ink tool was deactivated due to a timeout, FIG. 5 illustrates the digital marking surface 500 after deactivation of the first ink tool associated with the ink unit 908. The ink unit 502 persists without an associated displayed floatie. The compound ink units "One" 504, "Two" 506, "Three" 508 and "Four" 510 remain. In alternative embodiments the first ink tool associated with the ink unit 908 may be deactivated by a double-tap gesture.

Some embodiments of the present invention may comprise a combination of ink-tool deactivation methods described above.

Figure 10A:
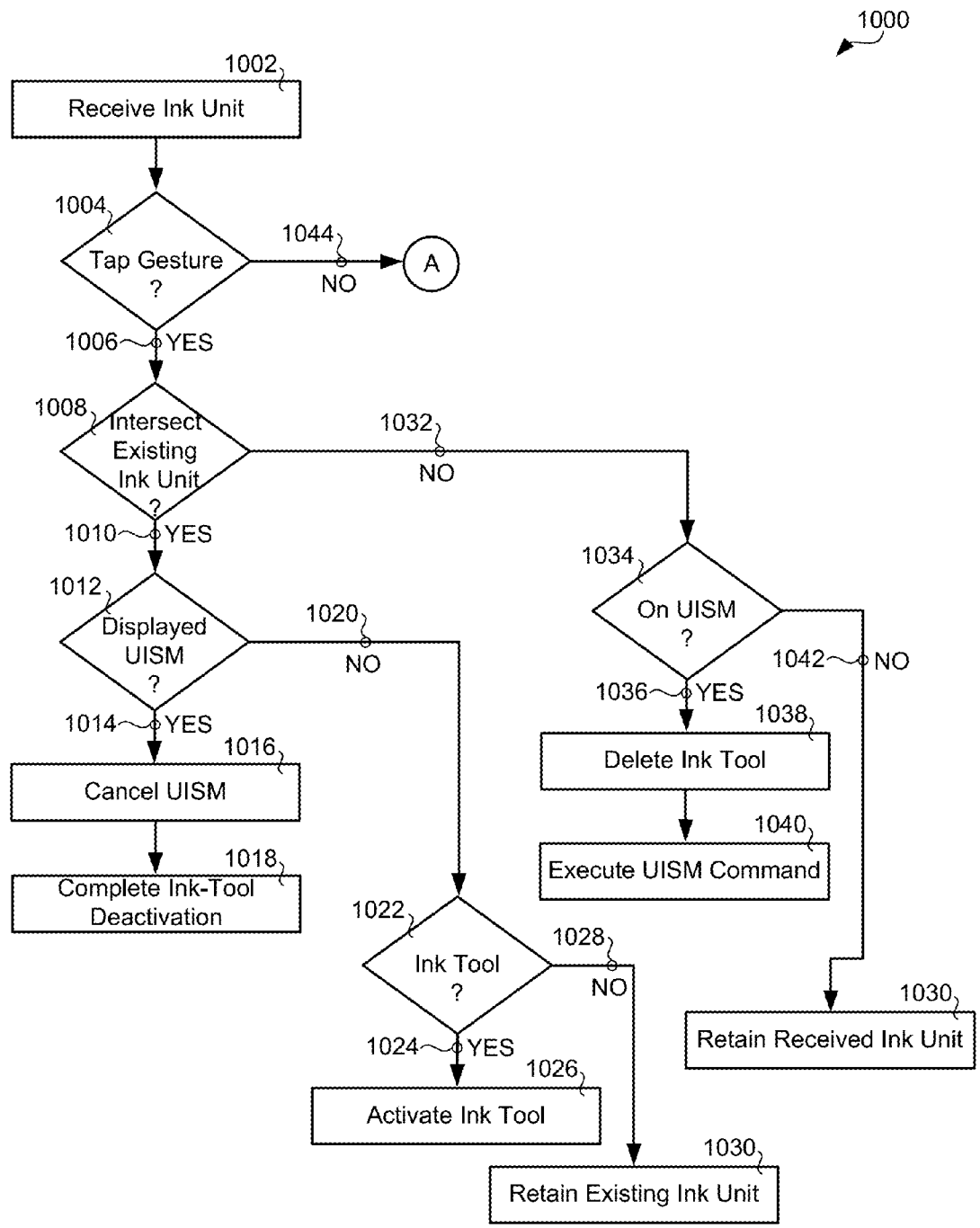
FIGS. 10A and 10B are a chart depicting some embodiments of the present invention comprising ink-tool deactivation via a tap gesture.
Figure 10B:
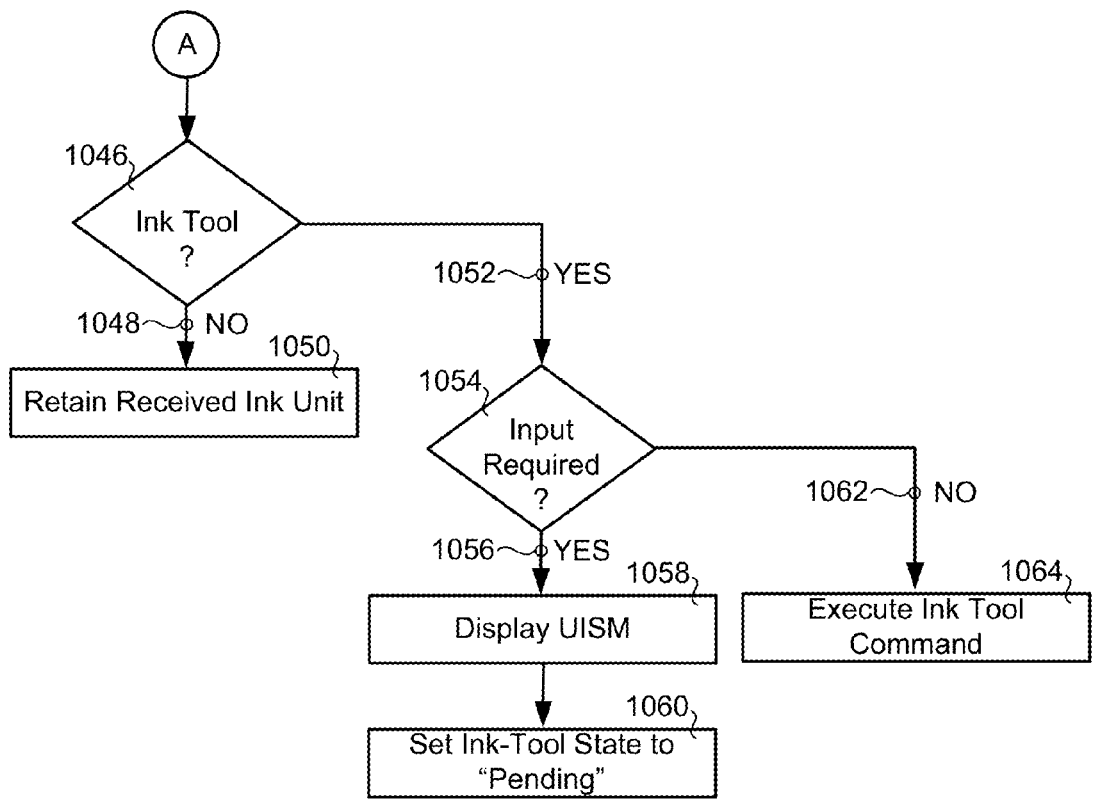

Some embodiments of the present invention may be described in relation to FIGS. 10A and 10B. FIGS. 10A and 10B are charts describing a method(s) 1000, in accordance with embodiments of the present invention, for deactivation of an ink tool. An ink unit may be received 1002 in a processor associated with a digital marking surface. A determination 1004 may be made as to whether or not the received ink unit is a tap gesture.

Figure 11:
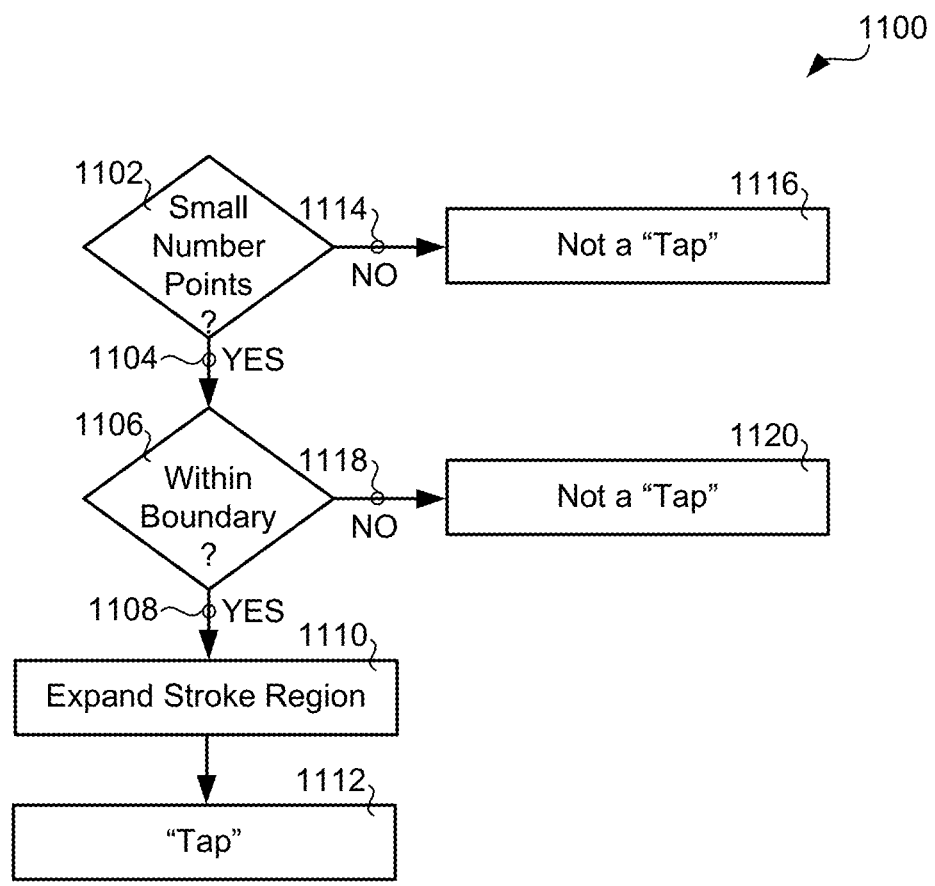
FIG. 11 is a chart depicting some embodiments of the present invention comprising tap recognition.

Some embodiments of the present invention may be described in relation to FIG. 11. FIG. 11 is a chart describing a method(s) 1100, in accordance with embodiments of the present invention, for determining whether or not an ink unit is a tap gesture, wherein a tap gesture corresponds to a user tapping a digital marking surface with a digital writing device. A determination 1102 may be made as to whether or not the received ink unit consists of a small number of points, for example, a single point or less than three points, wherein a point may be a cluster of pixels or a single pixel. If the received ink unit does 1104 consist of a small number of points, then a determination 1106 may be made as to whether or not the received ink unit is within the boundary of a small region, for example, a 10 pixel by 10 pixel region or other small region. If the received ink unit is 1108 within a small region, then the region may be expanded 1110 for additional processing, for example, to a 12 pixel by 12 pixel region, and the received ink unit may be classified 1112 as a "tap". If the received ink unit does not 1114 consist of a small number of points, then the received ink unit may be classified 1116 as "not a tap". If the received ink unit is not 1118 within a small region, then the received ink unit may be classified 1120 as "not a tap".

Referring again to FIG. 10A and FIG. 10B, if the received ink unit is determined 1006 to be a tap gesture, then a determination 1008 may be made as to whether or not the tap gesture intersects an existing ink unit. If the expanded stroke region identified during tap gesture determination intersects 1010 an existing ink unit, then a determination 1012 may be made as to whether or not there is a UISM displayed in conjunction with the existing ink unit. If there is 1014 a displayed UISM associated with the existing ink unit, then the UISM may be canceled 1016, as part of the ink-tool deactivation, removing the displayed UISM from the digital marking surface, and the ink-tool deactivation may be completed 1018. In some embodiments of the present invention, the ink-tool deactivation may further comprise setting the state of the ink tool to "dormant". In alternative embodiments, the ink-tool deactivation may further comprise removing an ink tool association from the ink-tool mark, and the ink-tool mark associated with the ink tool may persist as an ink unit. If there is not 1020 a displayed UISM associated with the existing ink unit, then a determination 1022 may be made as to whether or not the existing ink unit is associated with an ink tool. If the existing ink unit is 1024 associated with an ink tool, then the ink tool may be activated 1026. If the existing ink unit is not 1028 associated with an ink tool, then the existing ink unit may be retained 1030 as an ink unit without an associated ink tool.

If the tap gesture does not 1032 intersect an existing ink unit, then a determination 1034 may be made as to whether or not the tap gesture occurred on a UISM, if the tap gesture occurred 1036 on a UISM, then the ink tool may be deleted 1038. Deletion of the ink tool may comprise removing, from the digital marking surface, the ink-tool mark associated with the ink tool that is associated with the UISM. The command selected from the UISM may be executed 1040.

If the tap gesture did not occur 1042 on a UISM, then the received ink unit may be retained 1030 as an ink unit without an associated ink tool.

If the received ink unit is not 1044 classified as a tap gesture, then the ink unit may be examined to determine 1046 whether or not the ink unit corresponds to an ink tool.

Figure 12:
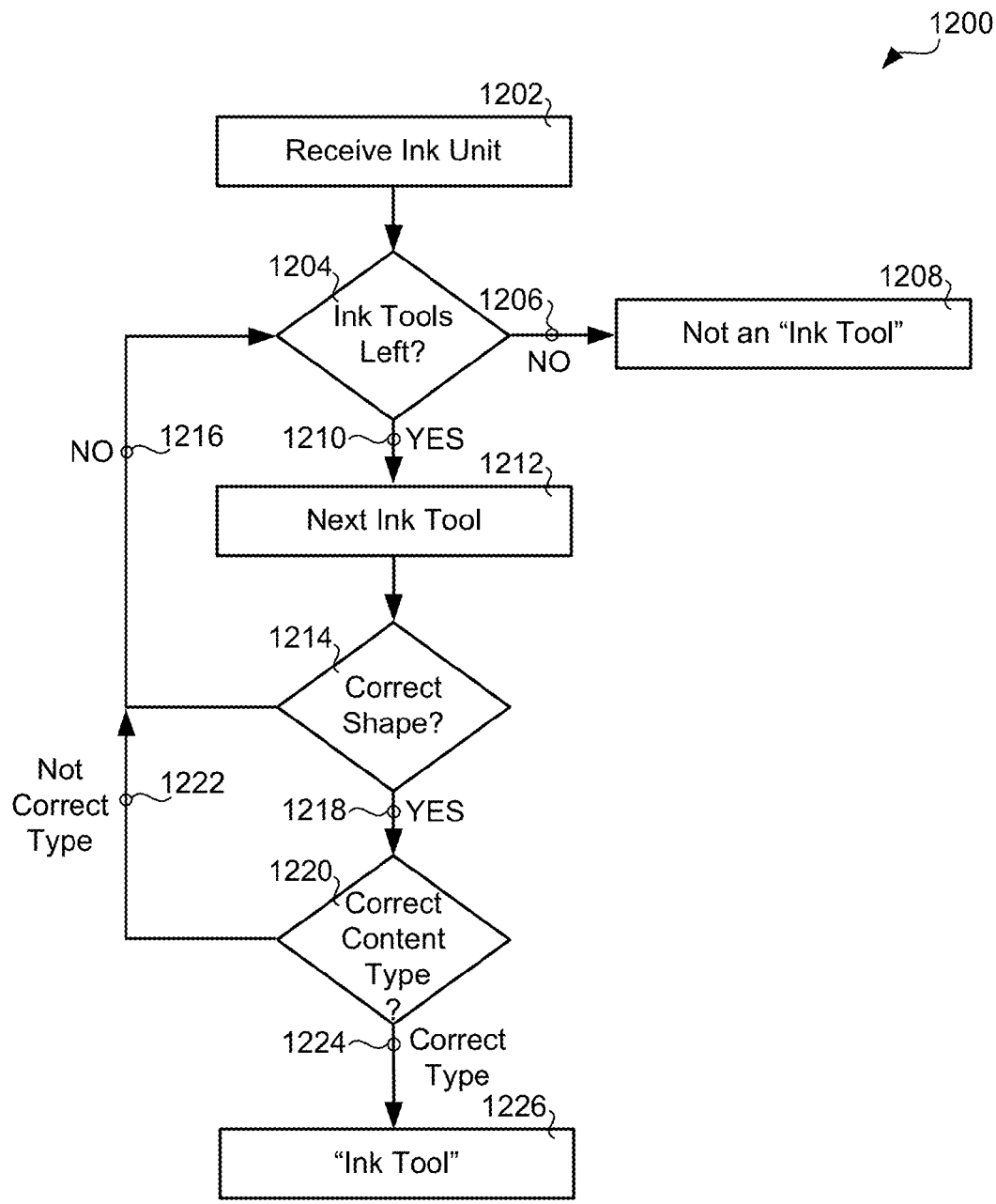
FIG. 12 is a chart depicting some embodiments of the present invention comprising ink-tool recognition.

Some embodiments of the present invention may be described in relation to FIG. 12. FIG. 12 is a chart describing a method(s) 1200, in accordance with embodiments of the present invention, for determining whether or not an ink unit is associated with an ink tool. The ink unit may be received 1202 by an ink-tool recognizer. A determination 1204 be made as to whether or not all possible ink tools have been considered. If all possible ink tools have 1206 been considered, then the received ink unit is not associated 1208 with an ink tool. If there are remaining ink tools to consider 1210, then a next ink tool may be considered 1212. A determination 1214 may be made as to whether or not the received ink unit has the correct shape for the ink tool under consideration. If not 1216, remaining ink tools, if any, may be considered. If so 1218, a determination 1220 may be made as to whether or not the received ink unit is proximate to content of an appropriate type for the ink tool. In some embodiments of the present invention, proximate may be spatial proximity. In alternative embodiments of the present invention, proximate may be temporal proximity. In yet alternative embodiments of the present invention, proximate may be semantic proximity. If appropriate content is not detected 1222, remaining ink tools, if any, may be considered. If appropriate content is detected 1224, then the received ink unit may be associated with the ink tool under consideration.

In some embodiments of the present invention comprising a deactivation ink tool for ink-tool deactivation, if the ink unit associated with the deactivation ink tool intersects, or is near to, another ink-tool ink mark, then that may be considered appropriate content and the deactivation ink tool may be applied to the intersected ink tool.

In some embodiments of the present invention comprising a deactivation ink tool for ink-tool deactivation, if the ink unit associated with the deactivation ink tool intersects, but does not start on, a UISM associated with an ink tool, then that may be considered appropriate content and the deactivation ink tool may be applied to the ink tool associated with the intersected UISM.

In some embodiments of the present invention comprising a deactivation ink tool for ink-tool deactivation, if the ink unit associated with the deactivation ink tools intersects a UISM associated with an ink tool, then that may be considered appropriate content and the deactivation ink tool may be applied to the ink tool associated with the intersected UISM.

In some embodiments of the present invention comprising a deactivation ink tool for ink-tool deactivation, if the ink unit associated with the deactivation ink tool is drawn on any otherwise blank portion of the digital marking surface, thus not intersecting any content, then that may be considered appropriate content and the deactivation ink tool may be applied to the spatially nearest active ink tool.

In some embodiments of the present invention comprising a deactivation ink tool for ink-tool deactivation, if the ink unit associated with the deactivation ink tool is drawn on any otherwise blank portion of the digital marking surface, thus not intersecting any content, then that may be considered appropriate content and the deactivation ink tool may be applied to the most recently activated ink tool.

In some embodiments of the present invention comprising a deactivation ink tool for ink-tool deactivation, if the ink unit associated with the deactivation ink tool is drawn on any otherwise blank portion of the digital marking surface, thus not intersecting any content, then that may be considered appropriate content and the deactivation ink tool may be applied to any ink tools meeting a predefined condition, for example, a condition related to ink-tool category, a condition related to ink-tool temporal activation, a condition related to ink-tool state and other conditions related to an ink tool or an ink-tool ink mark.

In some embodiments of the present invention, any combination of ink-unit placement as described above may effectuate recognition of the deactivation ink tool.

Referring again to FIG. 10A and FIG. 10B, if it is determined that the received ink unit is not 1048 associated with an ink tool, then the received ink unit may be retained 1050 as an ink unit without an associated ink tool. If it is determined that the received ink unit is 1052 associated with an ink tool, then a determination 1054 may be made as to whether or not the ink tool requires user input, for example, to disambiguate meaning, to provide input parameters and other user input. If user input is 1058 required, a UISM may be displayed to prompt for user input, and the state of the ink tool may be set 1060 to "pending".

If the ink tool does not 1062 require user input, then the ink-tool command may be executed 1064.

Figures 13, 14:
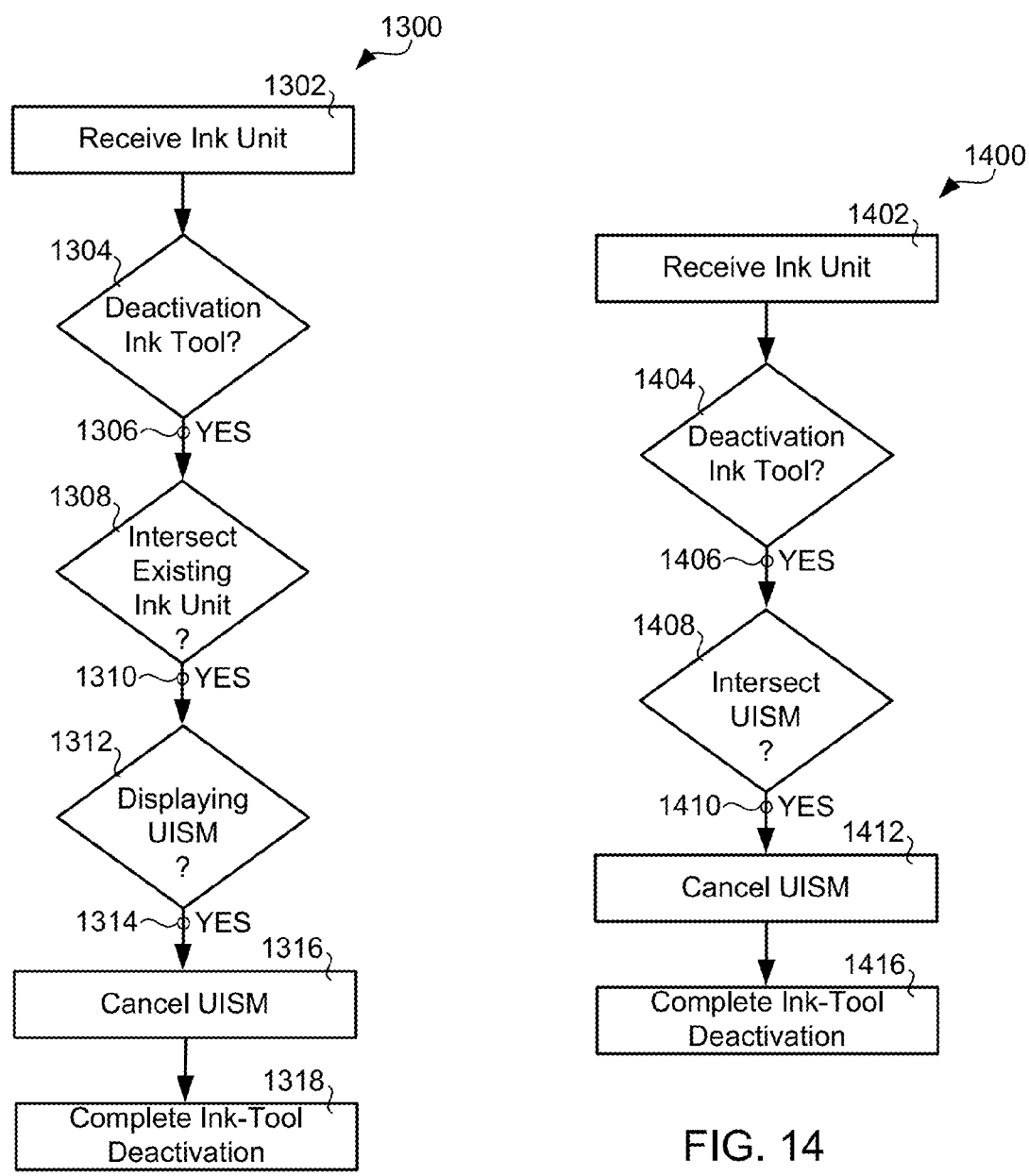
FIG. 13 is a chart depicting some embodiments of the present invention comprising a deactivation ink tool comprising operation based on placement of a first ink unit associated with the deactivation ink tool on a second ink unit associated with the ink tool for which deactivation is desired.
FIG. 14 is a chart depicting some embodiments of the present invention comprising a deactivation ink tool comprising operation based on placement of an ink unit associated with the deactivation ink tool on a user-input solicitation mechanism (UISM) associated with the ink tool for which deactivation is desired.

Some embodiments of the present invention illustrated in relation to FIG. 6 may be further described in relation to FIG. 13. FIG. 13 is a chart describing a method(s) 1300 for deactivation of an ink tool, in accordance with embodiments of the present invention. An ink unit may be received 1302. A determination 1304 may be made as to whether or not the received ink unit is an ink-mark shape associated with a deactivation ink tool. If so 1306, then a determination 1308 may be made as to whether or not the received ink unit intersects an existing ink unit on a digital marking surface. If so 1310, then a determination 1312 may be made as to whether or not a UISM is displayed in conjunction with the intersected ink unit. If so 1314, then the UISM may be canceled 1316, as part of the ink-tool deactivation, removing the displayed UISM from the digital marking surface, and deactivation of an ink-tool associated with the UISM may be completed 1318. In some embodiments of the present invention, the ink-tool deactivation may further comprise setting the state of the ink tool to "dormant". In alternative embodiments, the ink-tool deactivation may further comprise removing an ink tool association from the ink-tool mark. The ink-tool mark corresponding to the ink tool associated with the UISM may persist as an ink unit.

Some embodiments of the present invention illustrated in relation to FIG. 7 may be further described in relation to FIG. 14. FIG. 14 is a chart describing a method(s) 1400 for deactivation of an ink tool, in accordance with embodiments of the present invention. An ink unit may be received 1402. A determination 1404 may be made as to whether or not the received ink unit is an ink-mark shape associated with a deactivation ink tool. If so 1406, then a determination 1408 may be made as to whether or not the received ink unit intersects a UISM displayed on a digital marking surface. If so 1410, then the UISM may be canceled 1412, as part of the ink-tool deactivation, removing the displayed UISM from the digital marking surface, and deactivation of an ink-tool associated with the UISM may be completed 1416. In some embodiments of the present invention, the ink-tool deactivation may further comprise setting the state of the ink tool to "dormant". In alternative embodiments, the ink-tool deactivation may further comprise removing an ink tool association from the ink-tool mark. The ink-tool mark corresponding to the ink tool associated with the UISM may persist as an ink unit.

Figures 15, 16:
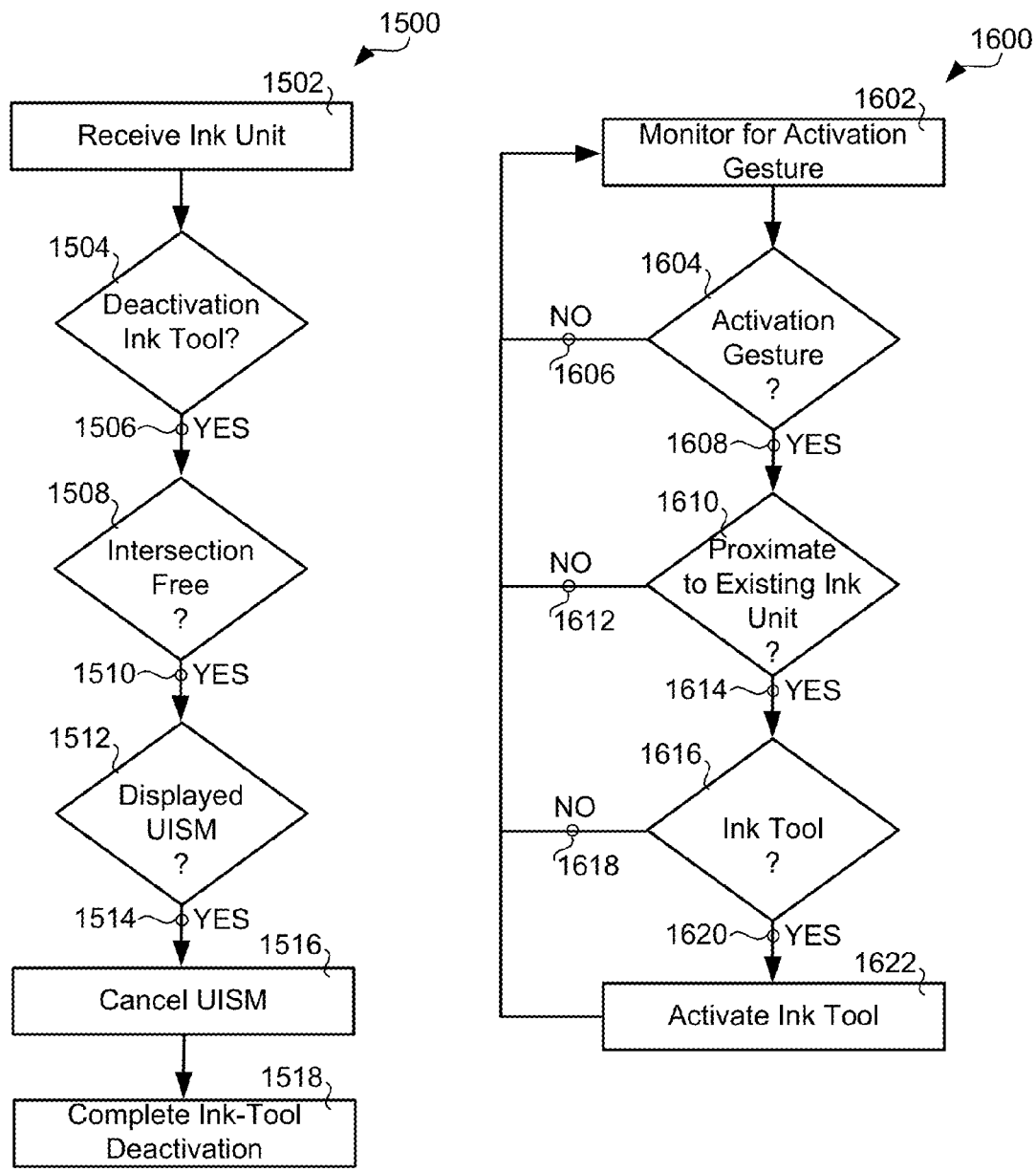
FIG. 15 is a chart depicting some embodiments of the present invention comprising a deactivation ink tool comprising operation based on placement of an ink unit associated with the deactivation ink tool on an otherwise unoccupied portion of a digital marking surface.
FIG. 16 is a chart depicting some embodiments of the present invention comprising activation of an ink tool based on an activation gesture applied proximate to an ink unit associated with the ink tool, wherein receipt of the activation gesture initiates determination of whether or not an ink tool is associated with the ink unit.

Some embodiments of the present invention illustrated in relation to FIG. 8 may be further described in relation to FIG. 15. FIG. 15 is a chart describing a method(s) 1500 for deactivation of an ink tool, in accordance with embodiments of the present invention. An ink unit may be received 1502. A determination 1504 may be made as to whether or not the received ink unit is an ink-mark shape associated with a deactivation ink tool. If so 1506, then a determination 1508 may be made as to whether or not the received ink unit is intersection free relative to any other existing ink units on a digital marking surface. If so 1510, then a determination 1512 may be made as to whether or not a UISM is displayed in conjunction with the received ink unit. If so 1514, then the UISM may be canceled 1516, as part of the ink-tool deactivation, removing the displayed UISM from the digital marking surface, and deactivation of an ink tool associated with the UISM may be completed 1518 leaving its associated ink unit as a persistent ink unit In some embodiments of the present invention, the ink-tool deactivation may further comprise setting the state of the ink tool to "dormant". In alternative embodiments, the ink-tool deactivation may further comprise removing an ink tool association from the ink-tool mark.

In alternative embodiments of the present invention, an ink tool associated with a user-drawn ink unit may not be activated until an activation event is received. In some embodiments, an ink unit associated with an ink tool may persist with the ink tool association even after a time-out event. In these embodiments, an ink unit persists as content until an activation event transforms the ink unit into an active ink tool.

Some embodiments of the present invention may be understood in relation to FIG. 16. FIG. 16 is a chart describing a method(s) 1600 for activation of an ink tool in accordance with embodiments of the present invention. In some embodiments of the present invention described in relation to FIG. 16, an ink unit may be examined, to determine if it is associated with an ink tool, only upon an activation event. A process may monitor 1602 for an activation gesture. In some embodiments of the present invention, the activation gesture may comprise a tap gesture. In some embodiments, a tap gesture may comprise one, or more, points contained within a small region, for example, a 10×10 pixel region. In alternative embodiments of the present invention, the activation gesture may comprise a double-tap gesture. In yet alternative embodiments of the present invention, the activation gesture may comprise a touch gesture, for example, a tap touch gesture, a double-tap touch gesture, a swipe gesture, a pinch gesture and other touch gestures. In still alternative embodiments of the present invention, the activation gesture may comprise an ink gesture, for example, an ink mark, ink unit and other ink gestures.

A determination 1604 may be made as to whether or not a received input is an activation gesture. If the received input is not 1606 an activation gesture, then activation-gesture monitoring may continue 1602. If the received input is 1608 an activation gesture, then a determination 1610 may be made as to whether or not the received activation gesture is in proximity to an existing ink unit. In some embodiments of the present invention, a region associated with a tap gesture may be expanded, and if the expanded region intersects an existing ink mark, then the received activation gesture may be determined to be 1614 in proximity to an existing ink unit. In some embodiments of the present invention, a 10×10 pixel tap-gesture-detection region may be expanded to a 12×12 pixel region for ink-mark-proximity detection. If the received activation gesture is not determined 1612 to be in proximity to an existing ink unit, then activation-gesture monitoring may continue 1602. If the received activation gesture is determined 1614 to be in proximity to an existing ink unit, then a determination 1616 may be made as to whether or not the in-proximity ink unit is associated with an ink tool. In some embodiments, the determination of whether or not the in-proximity ink unit is associated with an ink tool may be based on the shape of the ink unit. If the in-proximity ink unit is not 1618 associated with an ink tool, then activation-gesture monitoring may continue 1602. If the in-proximity ink unit is 1620 associated with an ink tool, then the ink tool may be activated 1622. The monitoring process 1602 may continue.

In some embodiments of the present invention, an existing ink unit may be determined to be in proximity to a received activation gesture when the existing ink unit is in spatial proximity to the ink mark associated with the received activation gesture.

In alternative embodiments of the present invention, an existing ink unit may be determined to be in proximity to a received activation gesture when the existing ink unit was received in temporal proximity to the received activation gesture.

In yet alternative embodiments of the present invention, an existing ink unit may be determined to be in proximity to a received activation gesture when the existing ink unit is semantically similar or associated with the received activation gesture.

In some embodiments of the present invention, activation 1622 of an ink tool, may effectuate content manipulation or other control actions through a software entity, or other entity. In some embodiments of the present invention, activation 1622 of an ink tool may initiate display of a UISM that presents multiple options associated with the ink tool. In some embodiments of the present invention, activation 1622 of an ink tool may effectuate removal of the ink unit associated with the ink tool from the display. In alternative embodiments, an ink unit associated with an ink tool may persist after an instance of activation of the ink tool thereby allowing re-activation of the ink tool at a subsequent time.

Figure 17:
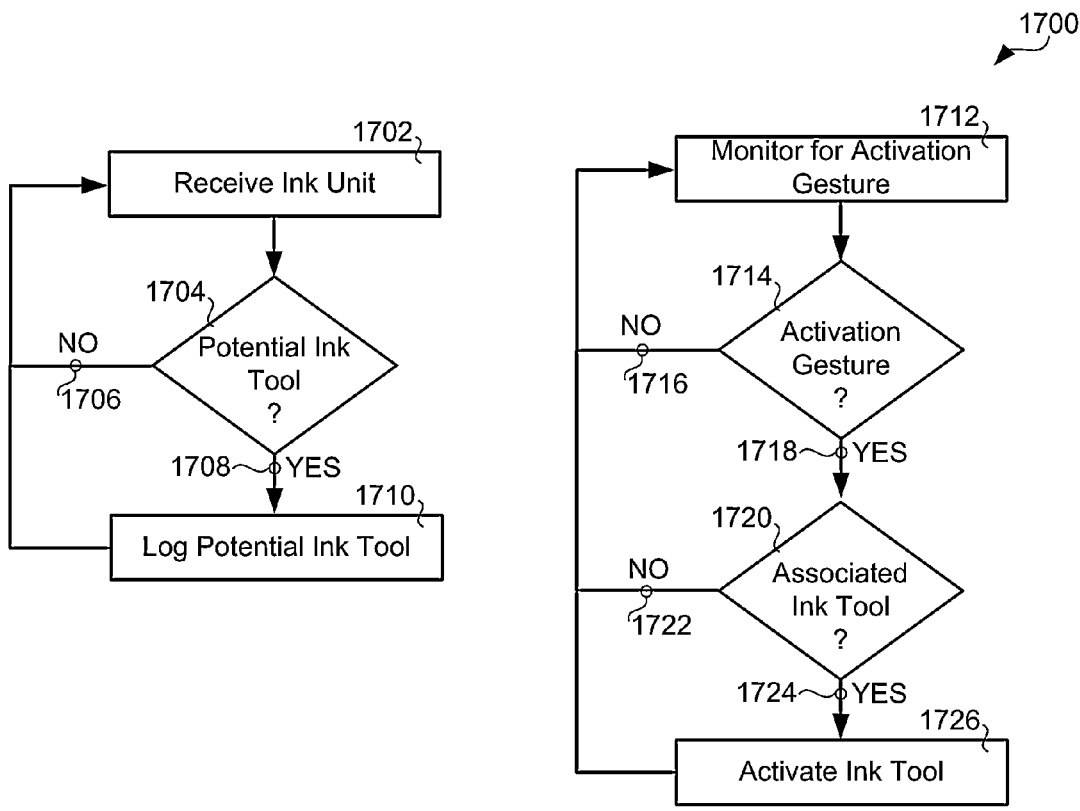
FIG. 17 is a chart depicting some embodiments of the present invention comprising activation of an ink tool based on an activation gesture applied proximate to an ink unit associated with the ink tool, wherein a potential ink tool is logged as a potential ink tool upon receipt of the ink unit associated with the ink tool.

Some embodiments of the present invention may be understood in relation to FIG. 17. FIG. 17 is a chart describing a method(s) 1700 for activation of an ink tool in accordance with embodiments of the present invention. In some embodiments of the present invention described in relation to FIG. 17, an ink mark may be examined to determine if it is associated with an ink tool upon receipt of the ink unit. A process may wait 1702 to receive an ink unit. The received ink unit may be examined 1704 to determine whether or not the received ink unit is associated with an ink tool. If the received ink unit is not 1706 associated with an ink tool, the process may wait 1702 for another ink unit. If the received ink unit is 1708 associated with an ink tool, then the received ink unit may be logged 1710 as a potential ink tool. In some embodiments of the present invention, logging 1710 may comprise an identifier identifying the potential ink tool. In some embodiments of the present invention, logging 1710 may comprise storing the location of the potential-ink-tool mark. In some embodiments of the present invention, logging 1710 may comprise storing the time at which the potential-ink-tool mark was placed on the digital marking surface.

The method 1700 may concurrently monitor 1712 for an activation gesture. In some embodiments of the present invention, the activation gesture may comprise a tap gesture. In some embodiments, a tap gesture may comprise one, or more, points contained within a small region, for example, a 10×10 pixel region. In alternative embodiments of the present invention, the activation gesture may comprise a double-tap gesture. In yet alternative embodiments of the present invention, the activation gesture may comprise a touch gesture, for example, a tap touch gesture, a double-tap touch gesture, a swipe gesture, a pinch gesture and other touch gestures. In still alternative embodiments of the present invention, the activation gesture may comprise an ink gesture, for example, an ink mark and other ink gestures.

A determination 1714 may be made as to whether or not a received input is an activation gesture. If the received input is not 1716 an activation gesture, then activation-gesture monitoring may continue 1712. If the received input is 1718 an activation gesture, then a determination 1720 may be made as to whether or not the received activation gesture is associated with an ink tool.

In some embodiments of the present invention, an activation gesture may be associated with an ink tool if the activation gesture intersects an ink unit associated with the ink tool.

In alternative embodiments of the present invention, an activation gesture may be associated with an ink tool if the activation gesture is spatially proximate to an ink unit associated with the ink tool.

In alternative embodiments of the present invention, an activation gesture may be associated with all ink tools of the same type as an ink tool for which the associated ink unit is located in proximity to the activation gesture.

In alternative embodiments, an activation gesture may be associated with an ink tool based on the activation-gesture location. For example, an activation gesture in a first region of the digital marking surface may be associated with a first category of ink tools. While an activation gesture in a second region of the digital marking surface may be associated with a second category of ink tools.

In alternative embodiments of the present invention, an activation gesture may be associated with an ink tool for which the associated ink unit was made within a predetermined time frame prior to receiving the activation gesture.

In alternative embodiments of the present invention, an activation gesture may be associated with an ink tool for which the associated ink unit was received most recently in relation to ink units associated with other ink tools. In alternative embodiments of the present invention, an existing ink unit may be determined to be in proximity to a received activation gesture when the existing ink unit was received in temporal proximity to the received activation gesture.

In yet alternative embodiments of the present invention, an activation gesture may be associated with an ink tool when the ink unit associated with the activation gesture is semantically similar or associated with the ink tool.

If the received activation gesture is not 1722 associated with an ink tool, then activation-gesture monitoring may continue 1712. If the received activation gesture is 1724 associated with an ink tool, then the ink tool may be activated 1726. The monitoring process 1712 may continue In some embodiments of the present invention, activation 1726 of an ink tool, may effectuate content manipulation or other control actions through a software entity, or other entity. In some embodiments of the present invention, activation 1726 of an ink tool may initiate display of a UISM that presents multiple options associated with the ink tool. In some embodiments of the present invention, activation 1726 of an ink tool may effectuate removal of the ink mark associated with the ink tool from the display. In alternative embodiments, an ink unit associated with an ink tool may persist after an instance of activation of the ink tool thereby allowing re-activation of the ink tool at a subsequent time.

Figure 18:
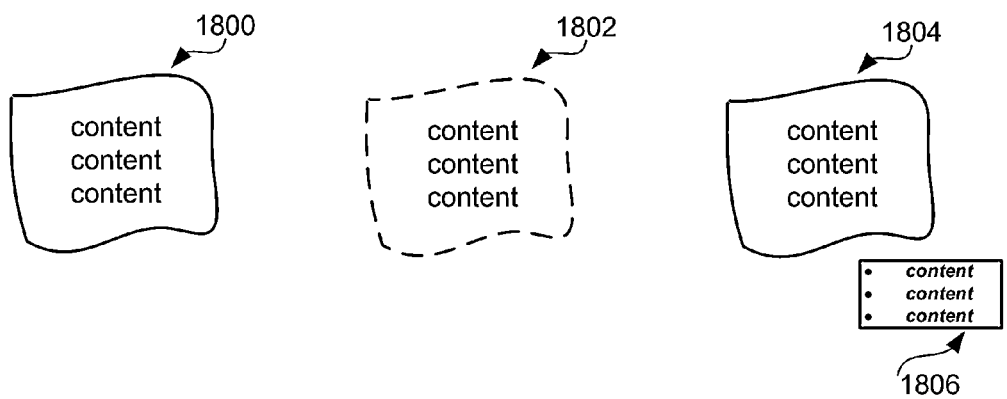
FIG. 18 is a picture illustrating visual cues, according to embodiments of the present invention, relating to a potential ink tool.

In some embodiments of the present invention described in relation to FIG. 17 and FIG. 18, when an ink unit, for example, the lasso mark 1800 is logged 1710 as a potential ink tool, the visual representation of the ink unit may be altered to provide a visual cue to a viewer that the ink unit is associated with an ink tool. In some embodiments, the ink unit may be altered physically, for example, the line format may be changed, for example, from solid to dashed 1802. Other physical alterations may include highlighting, color change, width change and alteration of other physical characteristics. In alternative embodiments, a visual hint 1806 may be displayed in proximity to the ink unit 1804.

In some embodiments, a visual hint 1806 may comprise a miniature rendering of the ink-tool operation or other visual hint intended to remind a user of the effect of the ink tool. For example, if the intended operation of the ink tool associated with the lasso mark 1800 is to form a bulleted list of the encircled content, a small, bulleted list 1806 may be displayed in proximity to the ink unit 1804.

Figure 19:
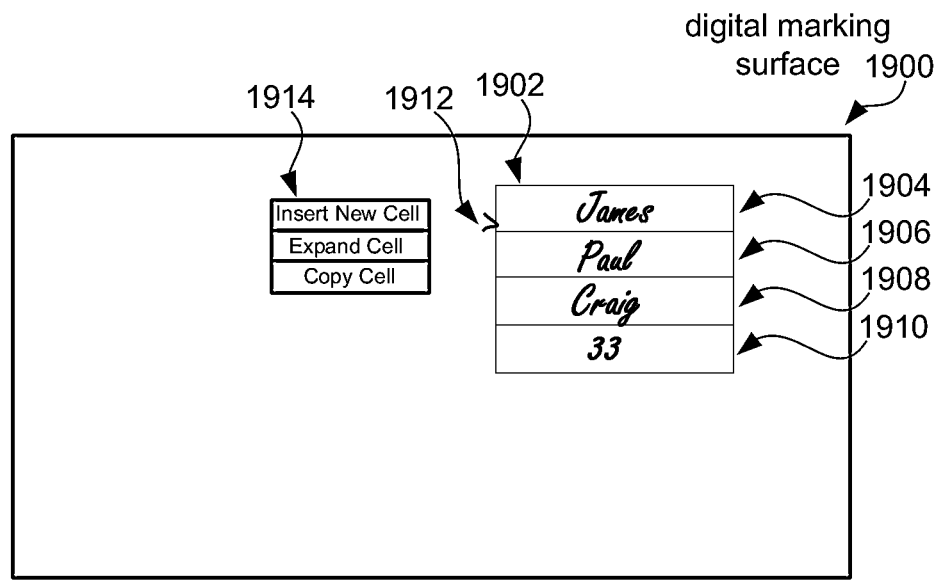
FIG. 19 is a picture illustrating operation of embodiments of the present invention relating to serial ink-tool activation.
Figure 20:
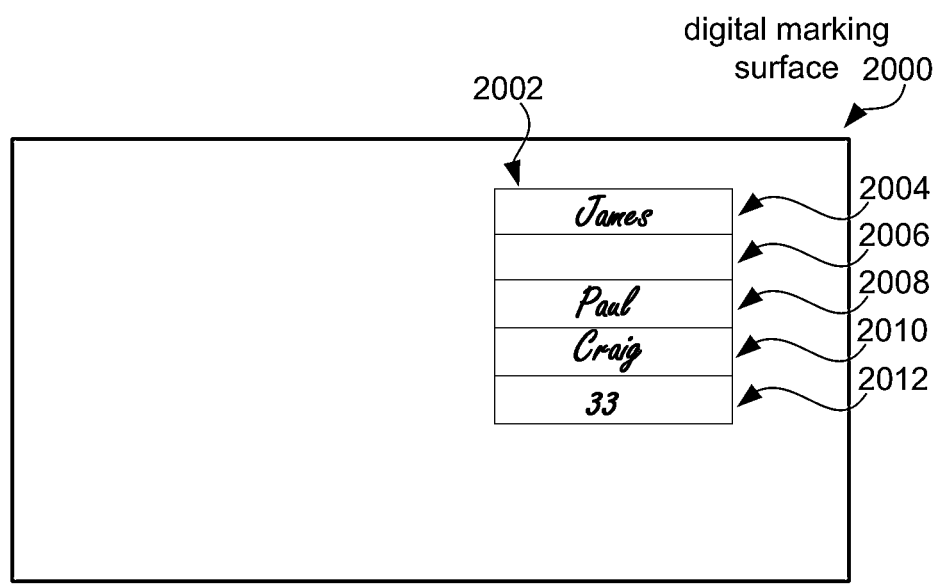
FIG. 20 is a picture illustrating operation of embodiments of the present invention relating to serial ink-tool activation.

FIG. 19 and FIG. 20 illustrate operation of some embodiments of the present invention. FIG. 19 depicts a digital marking surface 1900 on which a table 1902 is displayed. The table 1902 comprises four entries: a first entry 1904 "James"; a second entry 1906 "Paul"; a third entry 1908 "Craig"; and a fourth entry 1910 "33". An ink unit 1912 associated with an ink tool has been placed in proximity to the first table entry 1904. A pop-up menu 1914 has appeared in response to an activation gesture proximate to the ink unit 1912. The pop-up menu 1914 enumerates the possible actions associated with the ink tool. If a user selects the first entry 1916 "Insert New Cell", then a new cell may be entered between the first entry 1904 and the second entry 1906. FIG. 20 depicts the digital marking surface 2000 after the activation of the ink tool and selection from the pop-up menu. The table 2002 comprises five entries: a first entry 2004 "James"; a second entry 2006 that is an empty cell; a third entry 2008 "Paul"; a fourth entry 2010 "Craig"; and a fifth entry 2012 "33". A user may create a blank cell after each of the cells 1904, 1906 and 1908 by successive drawing of the ink unit associated with the ink tool by which a new cell may be inserted, activation of the ink tool and selection from the pop-up menu.

Figure 21:
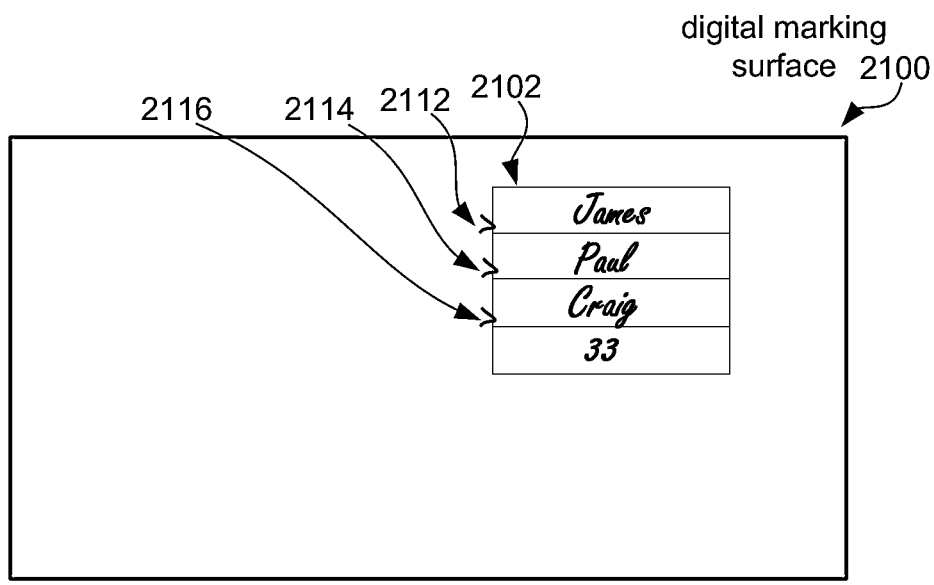
FIG. 21 is a picture illustrating operation of embodiments of the present invention relating to serial ink-tool activation.

Accordingly, as depicted in FIG. 21, a user may draw all three ink units 2112, 2114, 2116 and then successively activate each ink unit in turn and select from the pop-up menu to effectuate the addition of three new cells as described above.

In alternative embodiments of the present invention, a plurality of ink tools may be activated at the same time. A "start-grouping" activation gesture may initiate a grouping action whereby subsequent activation gestures add ink tools to a group for activation. A "stop-grouping" activation gesture may terminate grouping of ink tools and may activate all ink tools in the group.

In some embodiments of the present invention, when all ink tools within the group are of the same type, for example, ink tools requiring the same UISM and other functionally equivalent ink tools, a single UISM may be displayed upon activation of the ink-tool group.

In some embodiments of the present invention, a UISM associated with each ink tool may be displayed. In some of these embodiments, selection of a UISM item from any of the UISMs may be applied to all of the relevant ink tools. While, in others of these embodiments, a selection may be required for each ink tool from its respective UISM.

In some embodiments of the present invention, one UISM may be displayed for each category of ink tools within the selected group.

In some embodiments of the present invention, a composite UISM may be displayed comprising all selection items for each different category of ink tool within the selected group. In some embodiments of the present invention, a composite UISM may require multiple selections, for example, one for each category of ink tools. In alternative embodiments, a selection of a UISM item may effectuate activation of only those ink tools associated with the selected item and may effectuate deactivation of all other ink tools within the group. In alternative embodiments, a selection of a UISM item may effectuate activation of only those ink tools associated with the selected item and may effectuate formation of a second composite UISM for the remaining items associated with the other ink tools within the group, thereby leaving the other ink tools in a "pending" state, while completing the activation of the ink tools associated with the selected item.

In some embodiments of the present invention, the "start-grouping" activation gesture may comprise a double tap proximate to an ink mark associated with an ink tool. Subsequent single taps may add ink tools to the group, and another double tap may effectuate a stop-grouping action. In alternative embodiments, the "start-grouping" activation gesture may comprise a "start-grouping" ink unit proximate to a first ink unit associated with an ink tool. In some embodiments of the present invention, the "start-grouping" ink unit may be a "∧" ink unit, also referred to as an "up-carrot" ink unit. A subsequent single tap proximate to an ink unit associated with an ink tool may add the ink tool to the group, and a "stop-grouping" ink unit may terminate the grouping and effectuate activation of the ink tools within the group. In some embodiments of the present invention, the "stop-grouping" ink unit may be a "∨" ink unit, also referred to as a "down-carrot" ink unit. In some embodiments of the present invention, a "start-grouping" ink unit and a "stop-grouping" ink unit may comprise a typographically associated symbol pair, for example, "(" and ")", "[" and "]", "/" and "\", "{" and "}", "<" and ">", "∧" and "∨" and other symbol pairs typically associated together.

Figure 22:
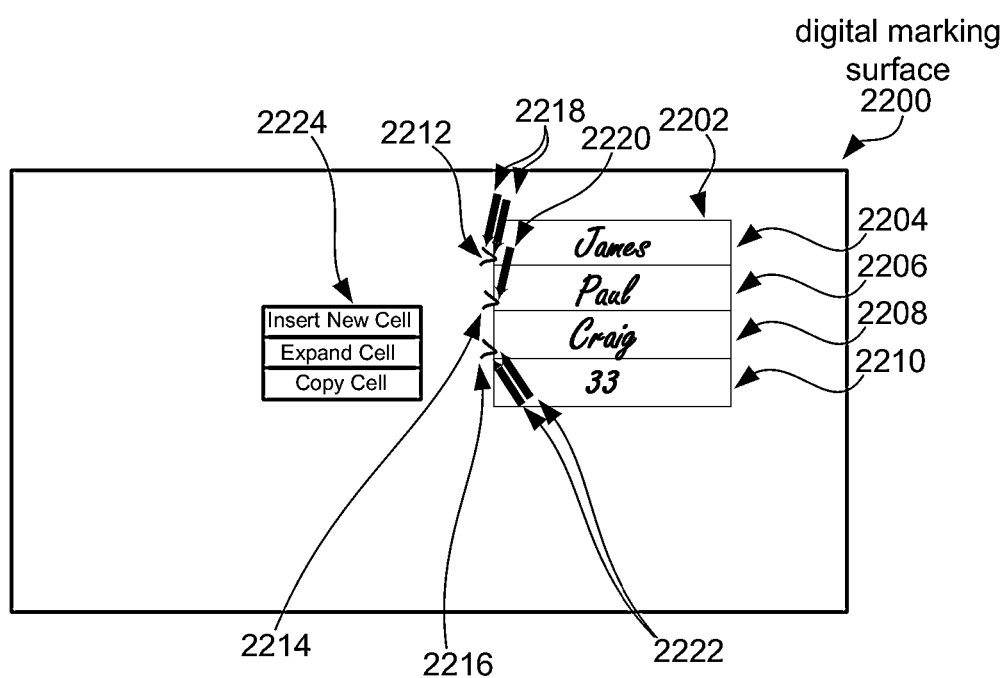
FIG. 22 is a picture illustrating operation of embodiments of the present invention relating to activation of multiple ink tools.
Figure 23:
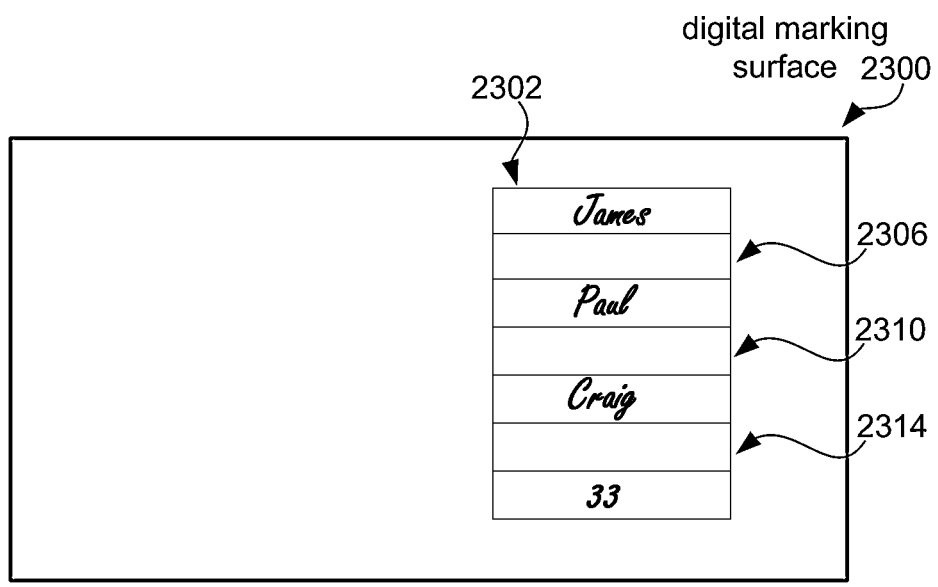
FIG. 23 is a picture illustrating operation of embodiments of the present invention relating to activation of multiple ink tools.

Some embodiments of the present invention may be illustrated in relation to FIG. 22. FIG. 22 depicts a digital marking surface 2200 on which a table 2202 is displayed. The table 2202 comprises four entries: a first entry 2204 "James"; a second entry 2206 "Paul"; a third entry 2208 "Craig"; and a fourth entry 2210 "33". An ink unit 2212, 2214, 2216 associated with an ink tool has been placed in proximity to each of the first three table entries 2204, 2206, 2208. A first double-tap gesture, illustrated by two stylus symbols 2218, proximate to a first ink unit associated with a first ink tool instance may activate the grouping process and add the first ink tool instance to a group of pending ink tools for activation. A single tap gesture, illustrated by one stylus symbol 2220, proximate to a second ink unit associated with a second ink tool instance may add the second ink tool instance to the group of pending ink tools. And a second double-tap gesture, illustrated by two stylus symbols 2222, proximate to a third ink unit associated with a third ink tool instance may add the third ink tool instance to the group of pending ink tools, may terminate the grouping process and may activate the ink tools in the group of pending ink tools. In some embodiments, a pop-up menu 2224 associated with the ink tool instances may appear and a user selection from the pop-up menu 2224 may be applied to all ink tool instances. Thus, a user selection of "Insert New Cell" will effectuate insertion of a new cell in association with each ink tool instance. FIG. 23 depicts the digital marking surface 2300 after the user selection "Insert New Cell". Three new cells 2306, 2310 and 2314 have been added to the table 2302.

In some embodiments of the present invention, the "start-grouping" activation gesture may comprise a double tap anywhere on the digital marking surface. Subsequent single taps may add ink tools to the group, and another double tap anywhere on the digital marking surface may effectuate a stop-grouping action. In alternative embodiments, the "start-grouping" activation gesture may comprise a "start-grouping" ink unit anywhere on the digital marking surface. In some embodiments of the present invention, the "start-grouping" ink unit may be a "∧" ink unit, also referred to as an "up-carrot" ink unit. A subsequent single tap proximate to an ink unit associated with an ink tool may add the ink tool to the group, and a "stop-grouping" ink unit may terminate the grouping and effectuate activation of the ink tools within the group. In some embodiments of the present invention, the "stop-grouping" ink unit may be a "∨" ink unit, also referred to as a "down-carrot" ink unit. In some embodiments of the present invention, a "start-grouping" ink unit and a "stop-grouping" ink unit may comprise a typographically associated symbol pair, for example, "(" and ")", "[" and "]", "/" and "\", "{" and "}", "<" and ">", "∧" and "∨" and other symbol pairs typically associated together.

Figure 24A:
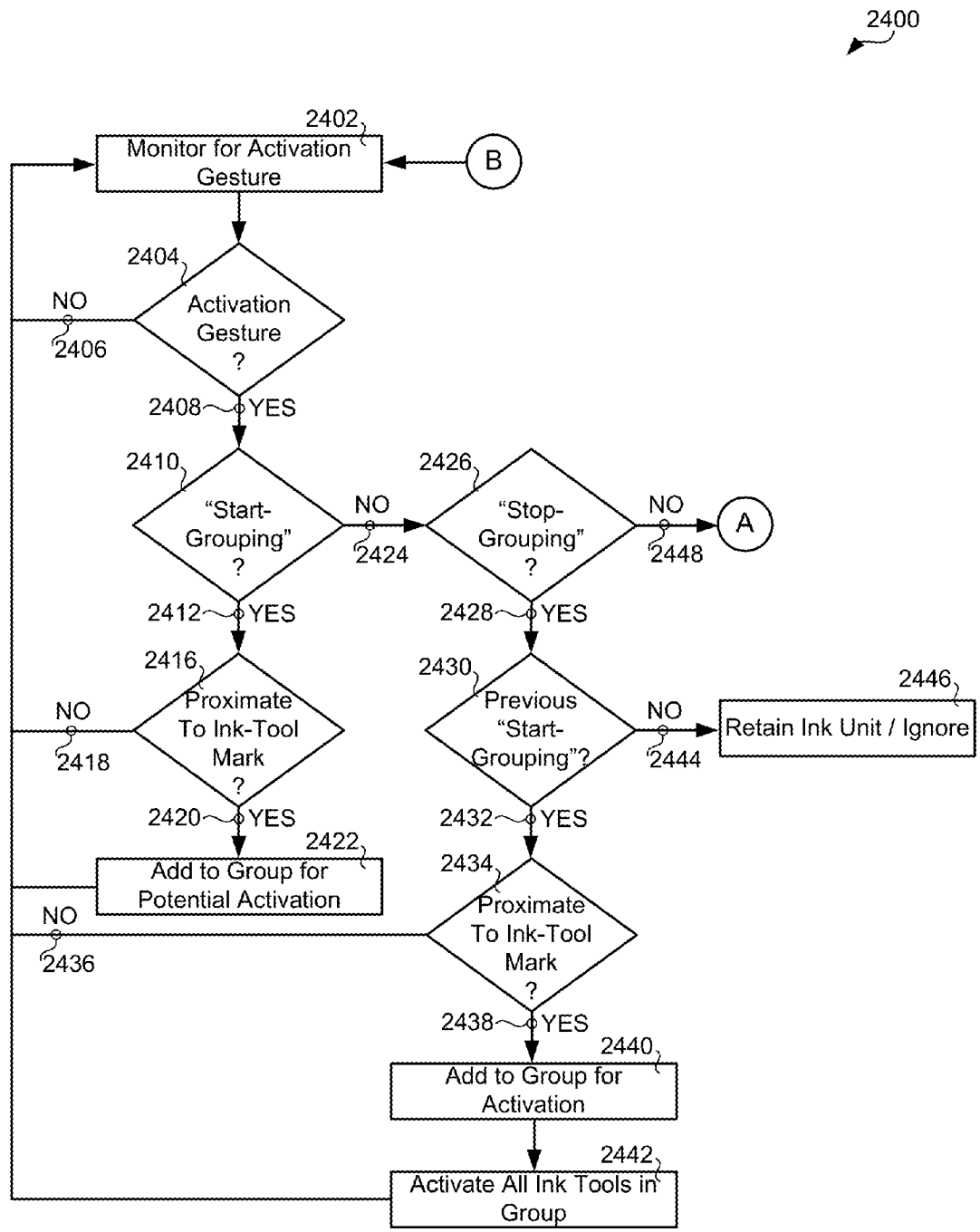
FIGS. 24A and 24B are a chart depicting some embodiments of the present invention comprising activation of multiple ink tools.
Figure 24B:
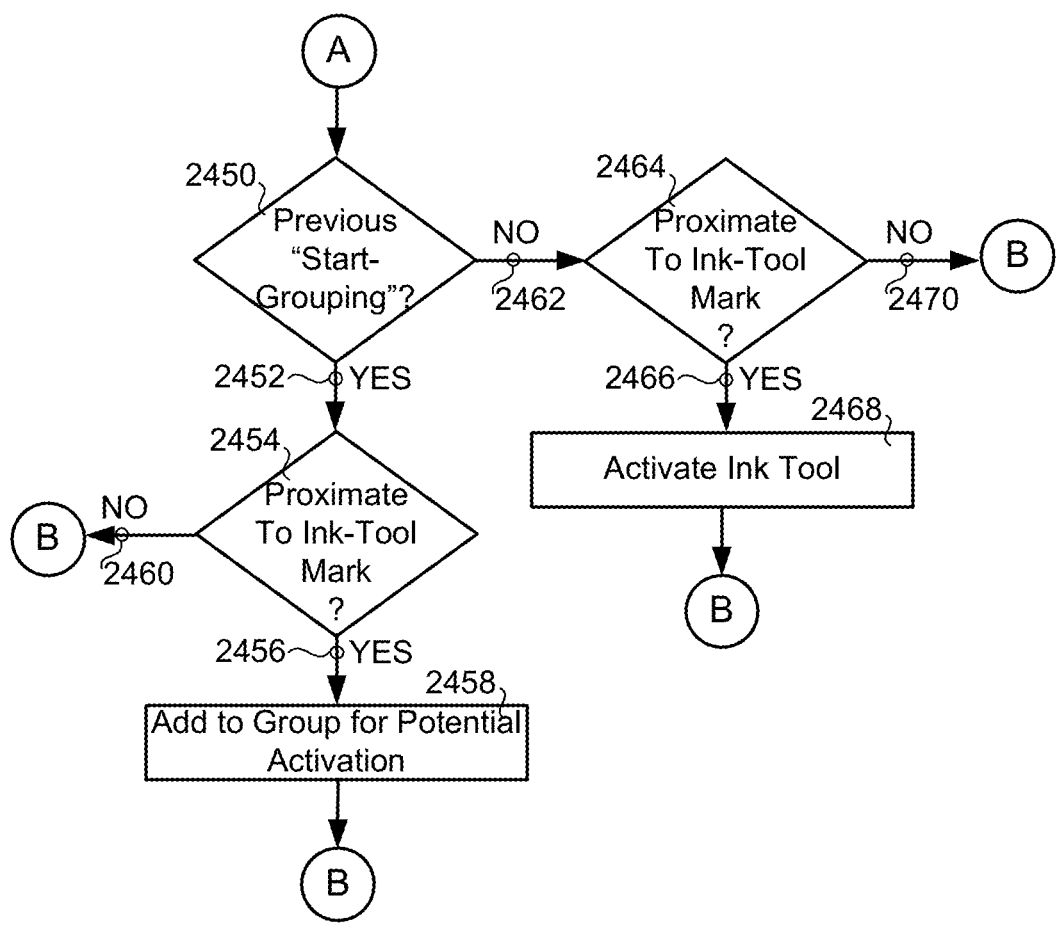

Some embodiments of the present invention may be understood in relation to FIGS. 24A and 24B. FIGS. 24A and 24B are a chart describing a method(s) 2400 for activation of multiple ink tools, in accordance with embodiments of the present invention. A process may monitor 2402 for an activation gesture. A determination 2404 may be made to determine if a received gesture is an activation gesture. If the received gesture is not 2406 an activation gesture, the monitoring 2402 process may continue. If the received gesture is 2408 an activation gesture, then a determination 2410 may be made as to whether or not the received gesture is a "start-grouping" activation gesture. If the received gesture is 2412 a "start-grouping" activation gesture, then a determination 2416 may be made as to whether or not the "start-grouping" activation gesture is proximate to an ink unit associated with an ink tool. If is the "start-grouping" activation gesture is not 2418 proximate to an ink unit associated with an ink tool, then the monitoring 2402 process may continue. If the "start-grouping" activation gesture is 2420 proximate to an ink unit associated with an ink tool, then the ink tool may be added to a group for potential activation. The monitoring 2402 process may continue.

If the received gesture is not 2424 a "start-grouping" activation gesture, then a determination 2426 may be made as to whether or not the received gesture is a "stop-grouping" activation gesture. If the received gesture is 2428 a "stop-grouping" activation gesture, then a determination 2430 may be made as to whether or not a previous "start-grouping" activation gesture has been received. If a previous "start-grouping" activation gesture has 2432 has been received, then a determination 2434 may be made as to whether or not the "stop-grouping" activation gesture is proximate to an ink unit associated with an ink tool. If the "stop-grouping" activation gesture is not 2436 proximate to an ink unit associated with an ink tool, then the monitoring 2402 process may continue. If the "stop-grouping" activation gesture is 2438 proximate to an ink unit associated with an ink tool, then the ink tool may be added to the group, all ink tools within the group may be activated 2442 and the monitoring 2402 process may continue.

If there was no 2444 previous "start-grouping" activation gesture, then the ink unit may be retained as a persistent ink unit with potential individual ink tool activation and the "stop-grouping" activation gesture may be ignored 2446.

If the received gesture is not 2448 a "stop-grouping" activation gesture, then a determination 2450 may be made as to whether or not a previous "start-grouping" activation gesture was received. If a previous "start-grouping" activation gesture was 2452 received, then a determination 2454 may be made as to whether or not the activation gesture is proximate to an ink unit associated with an ink tool. If the activation gesture is 2456 proximate to an ink unit associated with an ink tool, then the ink tool may be added 2458 to the group for potential activation, and then the monitoring 2402 process may continue. If the activation gesture is not 2460 proximate to an ink unit associated with an ink tool, then the monitoring 2402 process may continue.

If there was no 2462 previous "start-grouping" activation gesture, then a determination 2464 may be made as to whether or not the activation gesture is proximate to an ink unit associated with an ink tool. If the activation gesture is 2466 proximate to an ink unit associated with an ink tool, then the ink tool associated with the ink mark may be activated 2428, and the monitoring 2402 process may continue. If the activation gesture is not 2470 proximate to an ink unit associated with an ink tool, then the monitoring 2402 process may continue.

In some embodiments of the present invention, the "start-grouping" activation gesture may comprise a double tap in proximity to an ink unit associated with an ink tool. Subsequent single taps may add ink tools to the group, and another double tap may effectuate a stop-grouping action. In alternative embodiments, the "start-grouping" activation gesture may comprise a "start-grouping" ink mark in proximity to a first ink unit associated with an ink tool. In some embodiments of the present invention, the "start-grouping" ink unit may be a "∧" ink unit. A subsequent single tap proximate to an ink unit associated with an ink tool may add the ink tool to the group, and a "stop-grouping" ink unit may terminate the grouping and effectuate activation of the ink tools within the group. In some embodiments of the present invention, the "stop-grouping" ink unit may be a "∨" ink unit. In some embodiments of the present invention, a "start-grouping" ink unit and a "stop-grouping" ink unit may comprise a typographically associated symbol pair, for example, "(" and ")", "[" and "]", "/" and "\", "{" and "}", "<" and ">", "∧" and "∨" and other symbol pairs typically associated together.

In some embodiments of the present invention, activation of all ink tools in a group may comprise displaying a UISM for each ink tool instance, if required, and applying a received selection to all ink tool instances. In alternative embodiments, one UISM may be displayed for all ink tools for which the UISM is associated.

In some embodiments of the present invention, when all ink tools within the group are of the same type, for example, ink tools requiring the same UISM and other functionally equivalent ink tools, a single UISM may be displayed upon activation of the ink-tool group.

In some embodiments of the present invention, a UISM associated with each ink tool may be displayed. In some of these embodiments, selection of a UISM item from any of the UISMs may be applied to all of the relevant ink tools. While, in others of these embodiments, a selection may be required for each ink tool from its respective UISM.

In some embodiments of the present invention, one UISM may be displayed for each category of ink tools within the selected group.

In some embodiments of the present invention, a composite UISM may be displayed comprising all selection items for each different category of ink tool within the selected group. In some embodiments of the present invention, a composite UISM may require multiple selections, for example, one for each category of ink tools. In alternative embodiments, a selection of a UISM item may effectuate activation of only those ink tools associated with the selected item and may effectuate deactivation of all other ink tools within the group. In alternative embodiments, a selection of a UISM item may effectuate activation of only those ink tools associated with the selected item and may effectuate formation of a second composite UISM for the remaining items associated with the other ink tools within the group, thereby leaving the other ink tools in a "pending" state, while completing the activation of the ink tools associated with the selected item.

Figure 25A:
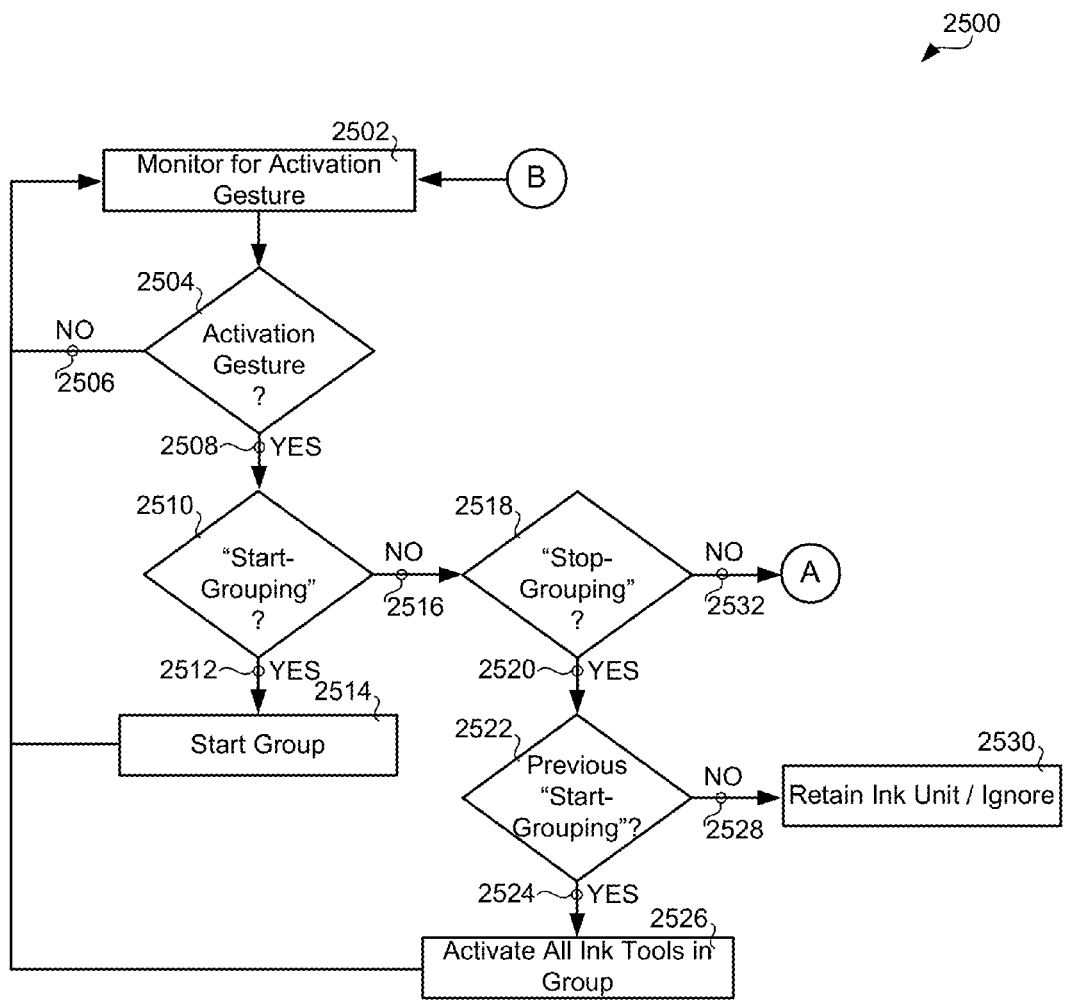
FIGS. 25A and 25B are a chart depicting some embodiments of the present invention comprising activation of multiple ink tools.
Figure 25B:
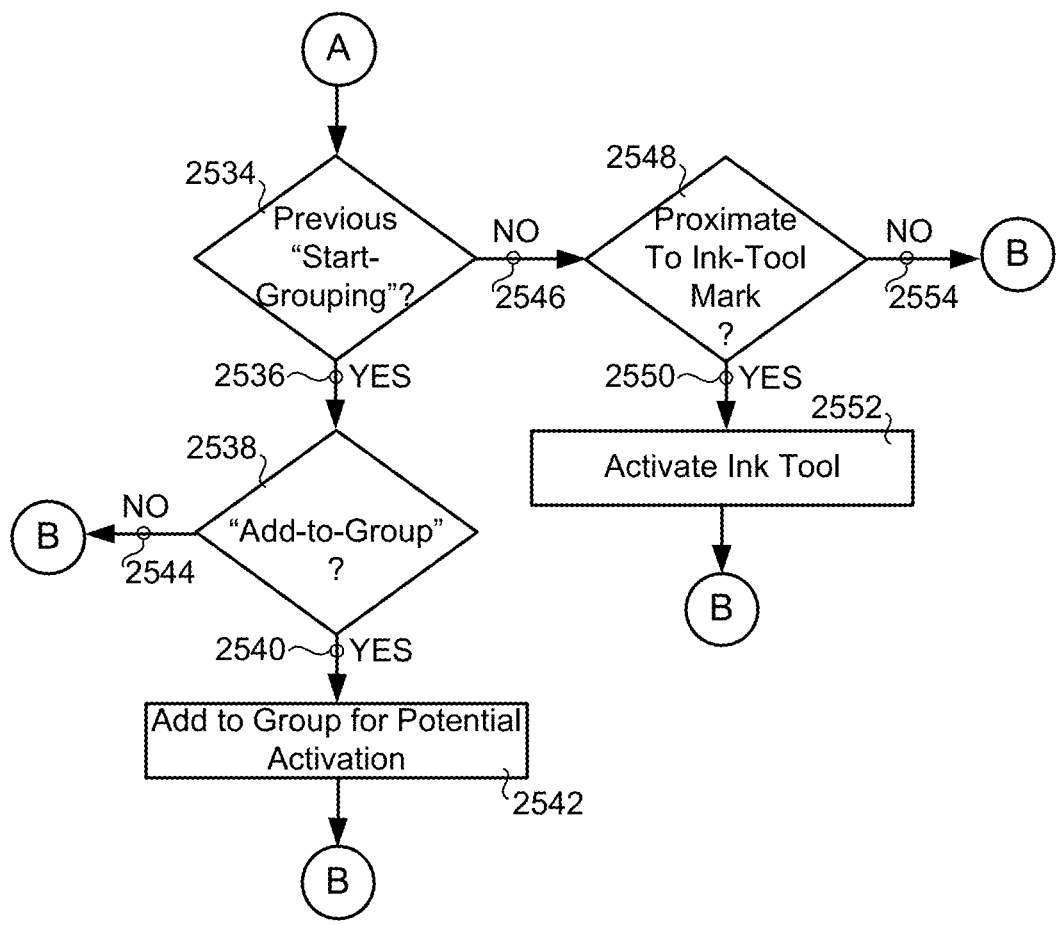

Some embodiments of the present invention may be understood in relation to FIGS. 25A and 25B. FIGS. 25A and 25B are a chart describing a method(s) 2500 for activation of multiple ink tools, in accordance with embodiments of the present invention. A process may monitor 2502 for an activation gesture. A determination 2504 may be made to determine if a received gesture is an activation gesture. If the received gesture is not 2506 an activation gesture, the monitoring 2502 process may continue. If the received gesture is 2508 an activation gesture, then a determination 2510 may be made as to whether or not the received gesture is a "start-grouping" gesture. If the received gesture is 2512 a "start-grouping" gesture, then a new group may be started, and the monitoring 2502 process may continue.

If the received gesture is not 2516 a "start-grouping" gesture, then a determination 2518 may be made as to whether or not the received gesture is a "stop-grouping" gesture. If the received gesture is 2520 a "stop-grouping" gesture, then a determination 2522 may be made as to whether or not a previous "start-grouping" gesture has been received. If a previous "start-grouping" gesture has 2524 has been received, then all ink tools within the group may be activated 2526 and the monitoring 2502 process may continue.

If there was no 2528 previous "start-grouping" gesture, then the ink unit may be retained as a persistent ink unit with potential individual ink tool activation and the "stop-grouping" gesture may be ignored 2530.

If the received gesture is not 2532 a "stop-grouping" gesture, then a determination 2534 may be made as to whether or not a previous "start-grouping" gesture was received. If a previous "start-grouping" gesture was 2536 received, then a determination 2538 may be made as to whether or not the activation gesture is an "add-to-group" activation gesture proximate to an ink unit associated with an ink tool. If the activation gesture is 2540 an "add-to-group" activation gesture proximate to an ink unit associated with an ink tool, then the ink tool may be added 2542 to the group for potential activation, and then the monitoring 2502 process may continue. If the activation gesture is not 2544 an "add-to-group" gesture proximate to an ink unit associated with an ink tool, then the monitoring 2502 process may continue.

If there was no 2546 previous "start-grouping" gesture, then a determination 2548 may be made as to whether or not the activation gesture is proximate to an ink unit associated with an ink tool. If the activation gesture is 2550 proximate to an ink unit associated with an ink tool, then the ink tool associated with the ink mark may be activated 2552, and the monitoring 2502 process may continue. If the activation gesture is not 2554 proximate to an ink unit associated with an ink tool, then the monitoring 2502 process may continue.

In some embodiments of the present invention, the "start-grouping" activation gesture may comprise a double tap. Subsequent single taps may add ink tools to the group, and another double tap may effectuate a stop-grouping action. In alternative embodiments, the "start-grouping" activation gesture may comprise a "start-grouping" ink unit. In some embodiments of the present invention, the "start-grouping" ink unit may be a "∧" ink unit. A subsequent single tap proximate to an ink unit associated with an ink tool may add the ink tool to the group, and a "stop-grouping" ink unit may terminate the grouping and effectuate activation of the ink tools within the group. In some embodiments of the present invention, the "stop-grouping" ink unit may be a "∨" ink unit. In some embodiments of the present invention, a "start-grouping" ink unit and a "stop-grouping" ink unit may comprise a typographically associated symbol pair, for example, "(" and ")", "[" and "]", "/" and "\", "{" and "}", "<" and ">", "∧" and "∨" and other symbol pairs typically associated together.

In some embodiments of the present invention, activation of all ink tools in a group may comprise displaying a UISM for each ink tool instance, if required, and applying a received selection to all ink tool instances. In alternative embodiments, one UISM may be displayed for all ink tools for which the UISM is associated.

In some embodiments of the present invention, when all ink tools within the group are of the same type, for example, ink tools requiring the same UISM and other functionally equivalent ink tools, a single UISM may be displayed upon activation of the ink-tool group.

In some embodiments of the present invention, a UISM associated with each ink tool may be displayed. In some of these embodiments, selection of a UISM item from any of the UISMs may be applied to all of the relevant ink tools. While, in others of these embodiments, a selection may be required for each ink tool from its respective UISM.

In some embodiments of the present invention, one UISM may be displayed for each category of ink tools within the selected group.

In some embodiments of the present invention, a composite UISM may be displayed comprising all selection items for each different category of ink tool within the selected group. In some embodiments of the present invention, a composite UISM may require multiple selections, for example, one for each category of ink tools. In alternative embodiments, a selection of a UISM item may effectuate activation of only those ink tools associated with the selected item and may effectuate deactivation of all other ink tools within the group. In alternative embodiments, a selection of a UISM item may effectuate activation of only those ink tools associated with the selected item and may effectuate formation of a second composite UISM for the remaining items associated with the other ink tools within the group, thereby leaving the other ink tools in a "pending" state, while completing the activation of the ink tools associated with the selected item.

Some embodiments of the present invention may comprise a computer program product comprising a computer-readable storage medium having instructions stored thereon/in which may be used to program a computing system to perform any of the features and methods described herein. Exemplary computer-readable storage media may include, but are not limited to, flash memory devices, disk storage media, for example, floppy disks, optical disks, magneto-optical disks, Digital Versatile Discs (DVDs), Compact Discs (CDs), micro-drives and other disk storage media, Read-Only Memory (ROMs), Programmable Read-Only Memory (PROMs), Erasable Programmable Read-Only Memory (EPROMS), Electrically Erasable Programmable Read-Only Memory (EEPROMs), Random-Access Memory (RAMS), Video Random-Access Memory (VRAMs), Dynamic Random-Access Memory (DRAMs) and any type of media or device suitable for storing instructions and/or data.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for deactivating a content-manipulative ink tool pending on a digital marking-surface system, the method comprising:
   receiving an ink unit on a digital marking surface of the digital marking-surface system;
   determining whether the ink unit is of a shape associated with a deactivation ink tool; and
   when the ink unit is of a shape associated with a deactivation ink tool:
      identifying preexisting ink-unit content, wherein the preexisting ink-unit content:
         is intersected by the ink unit;
         graphically indicates, on the digital marking surface, intersected handwritten ink content provisionally to be manipulated via the content-manipulative ink tool;
         is defined by a motion of a digital marking device along the digital marking surface between a digit-down-action or pen-down-action location and a digit-up-action or pen-up-action location of the digital marking device;
         is associated with the content-manipulative ink tool, wherein the content-manipulative ink tool is configured to, in response to receiving a selection of an item from the content-manipulative ink tool, modify the intersected content; and
         is displayed concurrently with the ink unit on the digital marking surface;
      determining whether a user-input solicitation mechanism offering selection for the content-manipulative ink tool is displayed as a menu on the digital marking surface in conjunction with the preexisting ink-unit content; and
      when a user-input solicitation mechanism offering selection for the content-manipulative ink tool is displayed as a menu on the digital marking surface in conjunction with the preexisting ink-unit content:
         canceling the user-input solicitation mechanism; and
         deactivating the content-manipulative ink tool.

2. A method as described in claim 1, wherein deactivating the content-manipulative ink tool includes removing the preexisting ink-unit content from the digital marking surface.

3. A method as described in claim 1, wherein canceling the user-input solicitation mechanism includes removing the user-input solicitation mechanism from the digital marking surface.

4. A method as described in claim 1, wherein the digital marking surface is part of a combined input/display device, and wherein the combined input/display device supports user placement of a digital ink mark on the digital marking surface.

5. A method for deactivating a content-manipulative ink tool pending on a digital marking-surface system, the method comprising:
receiving an ink unit on a digital marking surface of the digital marking-surface system;
determining whether the ink unit is of a shape associated with a deactivation ink tool; and
when the ink unit is of a shape associated with a deactivation ink tool:
identifying a preexisting user-input solicitation mechanism displayed as a menu on the digital marking surface, offering selection for the content-manipulative ink tool, and intersected by the ink unit, the content-manipulative ink tool being associated with a preexisting ink-tool mark, wherein the preexisting ink-tool mark:
graphically indicates, on the digital marking surface, handwritten ink content provisionally to be manipulated via the content-manipulative ink tool;
is defined by a motion of a digital marking device along the digital marking surface between a pen-down-action location and a pen-up-action location of the digital marking device;
is associated with the content-manipulative ink tool, wherein the content-manipulative ink tool is configured to, in response to receiving a selection of an item from the preexisting user-input solicitation mechanism, modify the intersected content; and
is displayed concurrently with the ink unit on the digital marking surface; and
canceling the preexisting user-input solicitation mechanism; and
deactivating the content-manipulative ink tool.

6. A method as described in claim 5, wherein deactivating the content-manipulative ink tool includes removing the preexisting ink-tool mark associated with the content-manipulative ink tool from the digital marking surface.

7. A method as described in claim 5, wherein canceling the preexisting user-input solicitation mechanism includes removing the preexisting user-input solicitation mechanism from the digital marking surface.

8. A method as described in claim 5, wherein the digital-marking-surface system comprises a combined input/display device, and wherein the combined input/display device supports user placement of a digital ink mark on a digital marking surface.

9. A method for deactivating a content-manipulative ink tool pending on a digital marking-surface system, the method comprising:
receiving an ink unit on a digital marking surface of the digital marking-surface system;
determining whether the ink unit is of a shape associated with a deactivation ink tool; and
when the ink unit is of a shape associated with a deactivation ink tool:
determining whether the ink unit intersects content on the digital marking surface; and
when the ink unit intersects no content on the digital marking surface:
determining whether a user-input solicitation mechanism offering selection for the content-manipulative ink tool is displayed as a menu on the digital marking surface, the content-manipulative ink tool being associated with a preexisting ink-tool mark, wherein the preexisting ink-tool mark:
graphically indicates, on the digital marking surface, handwritten ink content provisionally to be manipulated via the content-manipulative ink tool;
is defined by a motion of a digital marking device along the digital marking surface between a pen-down-action location and a pen-up-action location of the digital marking device;
is associated with the content-manipulative ink tool, wherein the content-manipulative ink tool is configured to, in response to receiving a selection of an item from the content-manipulative ink tool, modify the content; and
is displayed concurrently with the ink unit on the digital marking surface; and
when a user-input solicitation mechanism offering selection for the content-manipulative ink tool is displayed as a menu on the digital marking surface:
canceling the user-input solicitation mechanism; and
deactivating the content-manipulative ink tool.

10. A method as described in claim 9, wherein deactivating the content-manipulative ink tool includes removing the preexisting ink-tool mark associated with the ink tool from the digital marking surface.

11. A method as described in claim 9, wherein canceling the user-interface solicitation mechanism includes removing the user-interface solicitation mechanism from the digital marking surface.

12. A method as described in claim 9, wherein the digital-marking-surface system comprises a combined input/display device, wherein the combined input/display device supports user placement of a digital ink mark on the digital marking surface.

* * * * *